United States Patent
Wu et al.

(10) Patent No.: US 7,669,208 B2
(45) Date of Patent: Feb. 23, 2010

(54) OBJECT SYNCHRONIZATION BETWEEN OBJECT STORES ON DIFFERENT COMPUTERS

(75) Inventors: Charles Wu, Bellevue, WA (US);
George T. Hu, Redmond, WA (US);
Jeffrey R. Blum, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1609 days.

(21) Appl. No.: 10/643,710

(22) Filed: Aug. 19, 2003

(65) Prior Publication Data

US 2004/0010523 A1 Jan. 15, 2004

Related U.S. Application Data

(62) Division of application No. 08/944,948, filed on Oct. 2, 1997, now Pat. No. 6,633,924.

(51) Int. Cl.
*G06F 13/00* (2006.01)
(52) U.S. Cl. .................. 719/328; 719/316; 707/100
(58) Field of Classification Search ........ 719/316, 719/328; 707/100
See application file for complete search history.

(56) References Cited

U.S. PATENT DOCUMENTS

| | | | |
|---|---|---|---|
| 4,965,718 A | 10/1990 | George et al. | |
| 5,297,144 A | 3/1994 | Gilbert et al. | |
| 5,333,299 A | 7/1994 | Koval et al. | |
| 5,392,390 A | 2/1995 | Crozier | |
| 5,408,470 A | 4/1995 | Rothrock et al. | |
| 5,604,855 A | 2/1997 | Crawford | |
| 5,630,081 A | 5/1997 | Rybicki et al. | |
| 5,684,984 A | 11/1997 | Jone et al. | |
| 5,684,990 A | 11/1997 | Boothby | |
| 5,701,423 A | 12/1997 | Crozier | |
| 5,706,509 A | 1/1998 | Man-Hak Tso | |
| 5,734,642 A | 3/1998 | Vaishnavi et al. | |
| 5,758,355 A | 5/1998 | Buchanan | |

(Continued)

OTHER PUBLICATIONS

"Design of the Mneme Persistent Object Store" Moss, B. et al, ACM Transactions on Information Systems, Apr. 1990, pp. 103-139.

*Primary Examiner*—Andy Ho
(74) *Attorney, Agent, or Firm*—Lee & Hayes, PLLC

(57) ABSTRACT

The invention includes a method of synchronizing objects between first and second object stores. A synchronization manager in accordance with the invention maintains a reference store containing identifying data segments corresponding respectively to a plurality of objects that have previously been synchronized between the first and second object stores. An application program that maintains the first object store has associated interfaces that allow the synchronization manager to compare and manipulate objects. One such interface allows the synchronization manager to submit an identifying data segment associated with a particular object. In response, this interface returns a handle that corresponds to the submitted identifying data segment. Another interface accepts a handle that refers to an identifying data segment, and determines if the object corresponding to the identifying data segment has been changed in the first object store since the last synchronization. If it has, the synchronization manager takes steps to update the second object store. If, on the other hand, the object has changed in the second object store, application program interfaces allow the synchronization manager to update the object in the first object store. Objects are transferred through the synchronization manager in an arbitrary, application-specific format that is not determined or understood by the synchronization manager itself.

35 Claims, 5 Drawing Sheets

U.S. PATENT DOCUMENTS

| | | |
|---|---|---|
| 5,845,293 A | 12/1998 | Veghte et al. |
| 5,875,461 A * | 2/1999 | Lindholm ............... 711/118 |
| 5,884,323 A | 3/1999 | Hawkins et al. |
| 5,897,640 A | 4/1999 | Veghte et al. |
| 5,928,329 A | 7/1999 | Clark et al. |
| 5,943,676 A | 8/1999 | Boothby |
| 5,974,238 A | 10/1999 | Chase, Jr. |
| 6,000,000 A | 12/1999 | Hawkins et al. |
| 6,006,274 A | 12/1999 | Hawkins et al. |
| 6,044,381 A | 3/2000 | Bopthby et al. |
| 6,081,806 A | 6/2000 | Chang et al. |
| 6,128,661 A | 10/2000 | Flanagin et al. |
| 6,295,541 B1 | 9/2001 | Bodnar et al. |
| 6,317,797 B2 | 11/2001 | Clark et al. |
| 6,330,568 B1 | 12/2001 | Boothby et al. |
| 6,330,618 B1 | 12/2001 | Hawkins et al. |
| 6,401,112 B1 | 6/2002 | Boyer et al. |
| 6,442,570 B1 | 8/2002 | Wu |

* cited by examiner

OBJECT SYNCHRONIZATION BETWEEN OBJECT STORES ON DIFFERENT COMPUTERS

RELATED APPLICATION

This application is a divisional of U.S. patent application Ser. No. 08/944,948 filed Oct. 2, 1997, now U.S. Pat. No. 6,633,924.

TECHNICAL FIELD

This invention relates to methods of synchronizing any form of data such as databases used in personal information managers, especially when the databases are used on two different computers that are only occasionally connected for data communications.

BACKGROUND

As electronic components have continued to become smaller and less expensive, laptop, handheld, and other portable computers have become more and more popular. Although a variety of applications can be used with such computers, personal information managers (PIMs) form an important category of application programs that are particularly suited for use with portable computers or other portable information devices.

To get the most benefit from a PIM on a portable device, it is very useful if the PIM information can be kept up to date with a PIM that a user uses in conjunction with his or her desktop computer. Many portable computers are designed to connect with a desktop and to exchange information. When compatible PIMs are used on a portable computer and a desktop computer, it is possible to use this connectivity to update the PIMs so that the latest updates made by a user on one PIM are also reflected in the other PIM. This is referred to as "synchronization."

There are many competing desktop PIM applications on the market today. Each of them uses very different data formats. It is imperatively important for a portable device to be able to synchronize its data with each of these PIM applications. This requires a flexible and extensible architecture such that a synchronization software module can be easily written for a particular PIM application.

In contrast to previous methods of synchronizing PIMs, the inventors have developed a versatile system that allows a PIM on a portable computer to be synchronized with a great variety of desktop PIMs. An important advantage of the invention is that neither PIM component is required to track changes. Rather, this is taken care of by software components that are independent of the PIMs. These independent components can be used in conjunction with a number of different PIMs or similar database programs. Another important advantage of the invention is that it makes no assumption on the format of the data that are transferred between two computers. Therefore, the developer of a synchronization module has the total freedom to use different data formats depending only on specifics of the particular PIM application.

SUMMARY

In accordance with the invention, a synchronization manager executes on a primary computer. The synchronization manager maintains a reference store and communicates with an auxiliary computer. Respective PIMs or other database management programs run on each computer. An object store is maintained on each computer.

Two additional components (usually in the form of DLLs) are used. A first interface component is associated with the PIM that executes on the primary computer. A second interface component is associated with the PIM that executes on the auxiliary computer. Each component exposes a defined set of interface methods.

On the primary computer, identifying data segments are maintained persistently in the reference store for each object in the primary computer's object store. The data segments are defined by the developer of the interface components—the synchronization manager has no knowledge of the type of data stored in these segments. The identifying data segments are derived from the objects, so that comparing a stored identifying data segment with a currently derived data segment results in an indication of whether the corresponding object has been changed since it was last synchronized. Such comparisons are performed by the interface components, rather than by the synchronization manager.

In the exemplary implementation of the invention, the identifying data segments include data representing any properties provided by the auxiliary computer's object store that are not supported in the primary computer's object store. This allows such properties to be recovered from the primary computer if they are lost from the auxiliary object store.

Objects stored in the object store maintained by the auxiliary computer also have identifiers. These identifiers are usually different from the identifying data segments used in the primary object store. A mapping is maintained by the synchronization manager so that when an object is changed in one store, the corresponding object in another store can be located and the same change can be applied to that object. Each time a new object in the primary store is created and synchronized to the auxiliary store, the synchronization manager retrieves the identifier for that new object in the auxiliary object store and uses it to establish a mapping between these two objects. All these mappings are stored in synchronization manager's reference store, along with the identifying data segments.

Whenever an object needs to be transferred from one store to another, the synchronization manager calls interface methods exposed by the interface components. These methods convert an object into a series of bytes. The synchronization manager then transfers these bytes to the other store and by calling an interface method that converts the bytes back to an object.

DETAILED DESCRIPTION

General Architecture

Figure 1:
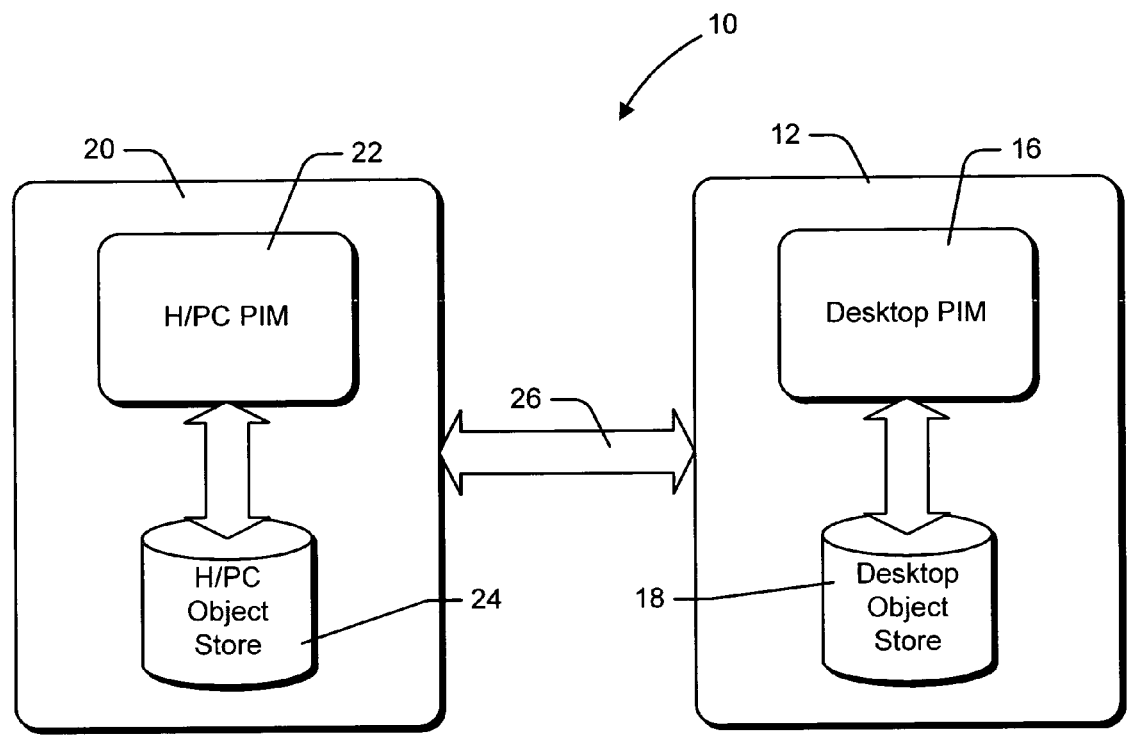
FIG. 1 is a block diagram of a system in accordance with the invention for synchronizing two object stores.

FIG. 1 shows a system 10 for synchronizing objects between first and second object stores. The system comprises a primary computer 12 and a portable computer or information device 20. An application program 16 executes on the primary computer to maintain a first or primary object store 18 on the primary computer. The application program is a personal information manager (PIM) or contact database program in the exemplary embodiment of the invention, although other database programs and various applications might also be configured to take advantage of the synchronization architecture described herein.

The Schedule+ program, available from Microsoft Corporation of Redmond, Wash., is one example of a PIM that can be configured in accordance with the invention. Microsoft Outlook 97 is another example. The primary object store, also referred to as a desktop object store, is configured to store a plurality of individual records or objects, each comprising a plurality of fields or properties. In Schedule+, for example, there are objects of different types, corresponding to appointments, contacts, and tasks. Each object comprises a plurality of properties, such as addresses, phone numbers, task descriptions, etc.

Portable information device 20 is implemented as a handheld personal computer (H/PC). H/PC 20 executes an application program 22 that maintains a second or auxiliary object store 24, also referred to as the H/PC object store. The application program in the exemplary embodiment of the invention is a general-purpose PIM.

The auxiliary object store similarly stores a plurality of objects, each comprising a plurality of properties. The objects are intended to be synchronized with the objects in primary store 18. Conceptually, any particular object exists in both H/PC object store 24 and desktop object store 18. Actually, however, there are two instances of the same object. When a user modifies one instance of an object, the other instance needs to also be modified so that the instances eventually contain identical data. This is referred to as synchronization, and is preferably accomplished without significant user effort.

In some situations, the H/PC object store has objects that include properties not supported by the desktop object store. As an example, a "contact" object in the H/PC object store includes a "home fax number" property that is not supported by Schedule+. Special steps are taken in accordance with the invention to accommodate this situation.

Synchronization managers run on both computers, communicating with the application programs on both computers through well defined interfaces to manage communications and synchronization. The synchronization managers of the two computers communicate with each other via an available communications medium 26 such as a physical cable or connection using a serial communications protocol. IR (infrared) communications can alternatively be used. Such communications capabilities are commonly available in desktop and portable computers.

Figure 2:
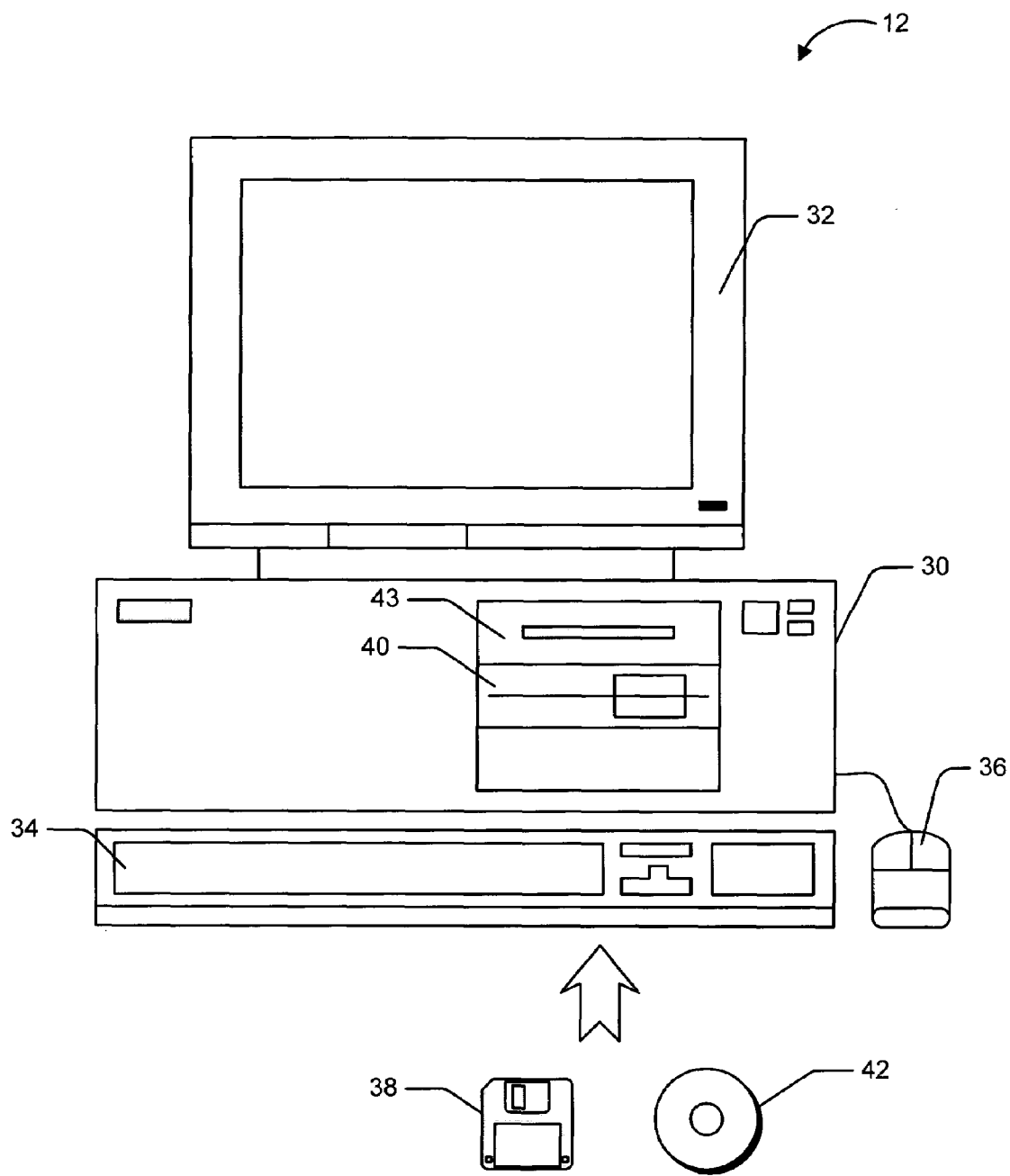
FIG. 2 shows a primary desktop computer such as used in conjunction with the invention.

FIG. 2 shows primary computer 12 as a conventional desktop computer. Desktop computer 12 in the illustrated embodiment is a conventional IBM-compatible computer having a central processing unit (CPU) 30, a display monitor 32, a keyboard 34, and a mouse 36. The computer 12 also utilizes a computer-readable storage medium such as a floppy memory diskette 38 in conjunction with a floppy disk drive 40. Computer 12 utilizes a further computer-readable storage medium in the form of an optical storage medium 42, such as a CD-ROM or DVD, in conjunction with a CD-reader or access device 43. Computer 12 might also include another input device in addition to, or in lieu of, the keyboard 34 and mouse 36 including such devices as a track ball, stylus, or the like.

Figure 3:
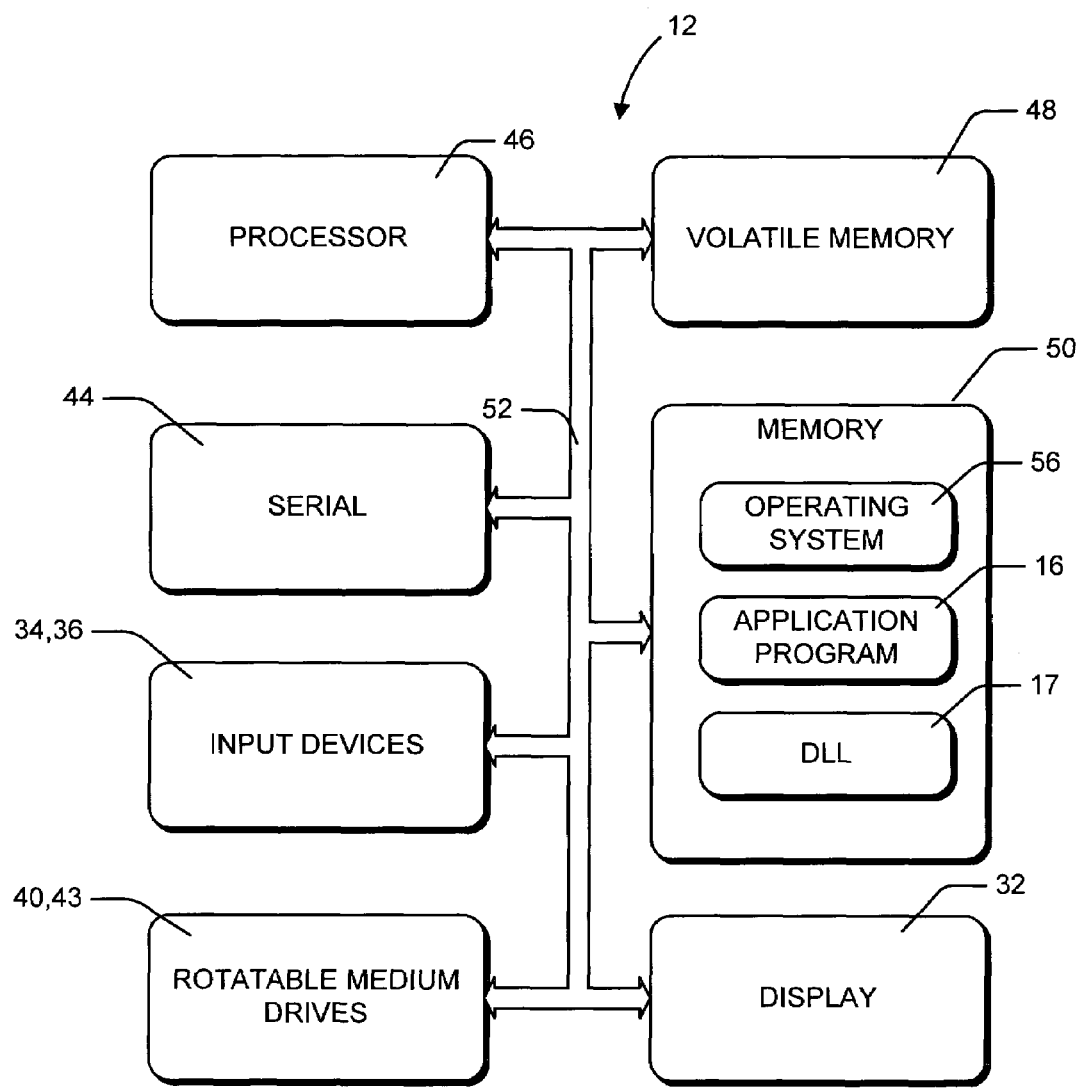
FIG. 3 is a simplified block diagram of the desktop computer of FIG. 2.

FIG. 3 shows a functional block diagram of computer 12. Computer 12 has a processor 46 and one or more forms of computer-readable storage media. Specifically, computer 12 includes a volatile memory 48 (e.g., RAM), and a non-volatile memory 50 interconnected by an internal bus 52. The non-volatile memory 50 can be implemented as integrated circuit chips (e.g., ROM, EEPROM), disk drive(s) (e.g., floppy, optical, hard), or a combination of both.

The display 32 is connected to the bus 52 through appropriate hardware interface drivers (not shown). Additionally, the input devices 34,36 are connected to supply data to the bus 52 via appropriate I/O ports. Floppy drive 40 and access device 43 are also connected through bus 52. Computer 12 includes a serial communications port 44 for communicating with portable information device 20. The serial communications port is connected for communications with processor 46 through bus 52.

The computer 12 runs an operating system 56 that is stored on the non-volatile memory 50 and executes on the processor 46. One preferred operating system is a Windows brand operating system sold by Microsoft Corporation, such as Windows 95 or Windows NT or other derivative versions of Windows. However, other operating systems may be employed, such as the Macintosh OS from Apple Corporation and the OS/2 Presentation Manager from IBM.

Application program 16 is stored in memory 48 or 50. An application such as Schedule+ can be loaded into memory 48 or 50 from the floppy diskette 38 or CD-ROM 42, or alternatively, downloaded from a network via a network port (not shown). A dynamically linked library (DLL) 17, comprising a plurality of executable functions, is associated with application program 16 for execution by processor 46.

Inter-process and inter-program calls are facilitated by using the component object model (COM) as is common in programs written for Microsoft Windows operating systems. When using COM, a software component such as the DLL mentioned above has a number of interfaces. Each interface exposes a plurality of methods, which can be called individually to utilize different services offered by the software component. In this document, the term "interface" is used somewhat more generically to indicate one or more software components, methods, or functions that can be called by some other software component, and that can optionally receive and return one or more parameter arguments. When first and second interfaces are described, for example, this could refer to two methods that are grouped together under the heading of a single COM interface.

Generally, the DLL associated with a particular application program is designed specifically to work in conjunction with that application program and to expose desktop synchronization interfaces that function as described below. Specifically, the DLL has a plurality of specifically defined interfaces that can be called by other programs or processes executing on computer 12. The DLL, in turn, is able to call interfaces exposed by application program 16, in order to access data representing individual properties of objects maintained by the application program. If the system includes a plurality of application programs that are to participate in synchronization, there is a DLL for each application program. Each DLL exposes the same set of interfaces. The applications themselves typically have widely different interfaces to which the DLLs must adapt.

Figure 4:
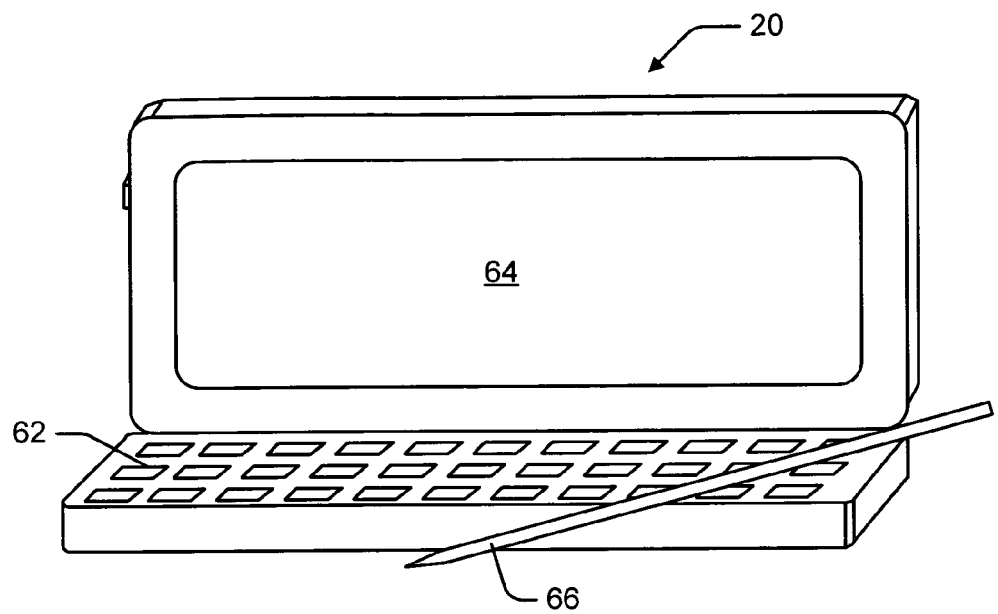
FIG. 4 shows an auxiliary, portable computer such as used in conjunction with the invention.

FIG. 4 shows a portable information device or handheld personal computer (H/PC) 20 such as might be used in conjunction with the invention. For purposes of this description, the term "portable information device" means a small computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like. In other implementations, the portable information device may be implemented as a personal digital assistant (PDA), a personal organizer, a palmtop computer, a computerized notepad, or the like.

H/PC 20 has components similar to those of desktop computer 12, including a miniaturized keyboard 62 and a small LCD display 64. Instead of a mouse, H/PC 20 uses a touch-sensitive display screen in conjunction with a stylus 66. The stylus is used to press the display at designated coordinates for user input.

Figure 5:
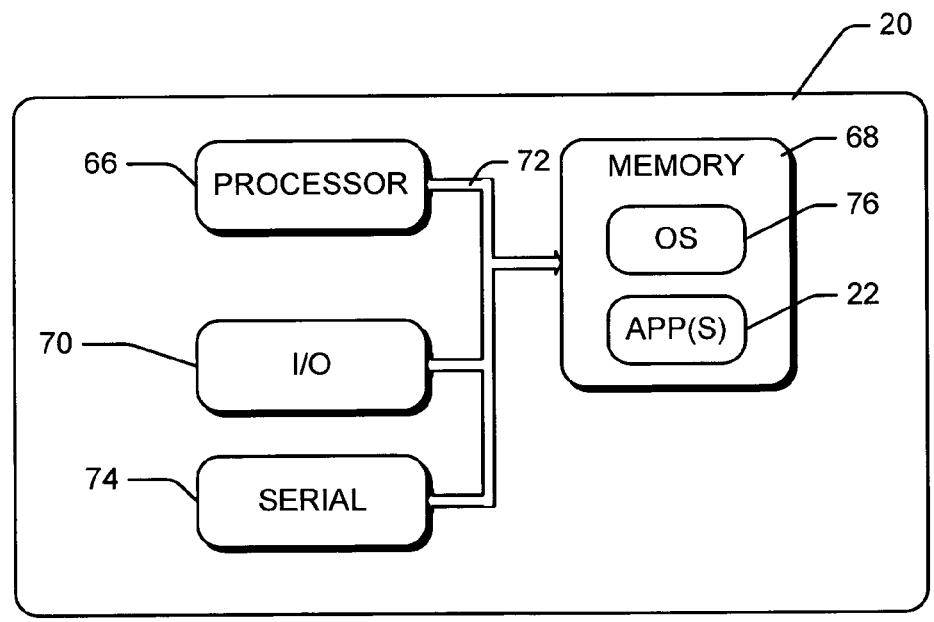
FIG. 5 is a simplified block diagram of the portable computer of FIG. 4.

FIG. 5 shows pertinent functional components of H/PC 20. It has a processor 66, memory 68, and I/O components 70 (including the display and keyboard). These components communicate over a bus 72. A serial interface 74 is available for communications with desktop computer 12. In current H/PCs, memory 68 is non-volatile electronic memory such as battery-backed RAM (random access memory). Part of this memory is allocated as addressable memory for program execution, and the remaining part is used to simulate disk storage.

An operating system 76 is loaded in and executes on processor 66 from memory 68 of H/PC 20. H/PC 20 preferably runs the Windows CE operating system from Microsoft Corporation. This operating system is a derivative of Windows brand operating systems, such as Windows 95, that is especially designed for handheld computing devices. Windows CE implements database features that can be utilized by application programs through a set of exposed application programming interfaces and methods. These interfaces are described in the section entitled "Application Program Interfaces and Methods, Part A" below. Second object store 24 (FIG. 1) is maintained by the operating system, at least partially in response to calls to these interfaces from application programs such as PIMs.

Application program 22 executes from memory 68 of H/PC 20. The application program in one embodiment is a PIM that utilizes the database features of the Windows CE operating system to store objects and their properties. This application program is not necessarily designed to be compatible with the PIM that executes on the desktop computer. Specifically, there may not be a one-to-one matching between the properties of specific object types. Some properties in the H/PC PIM may have no corresponding properties in the desktop PIM. Furthermore, neither PIM is necessarily designed with synchronization in mind.

Figure 6:
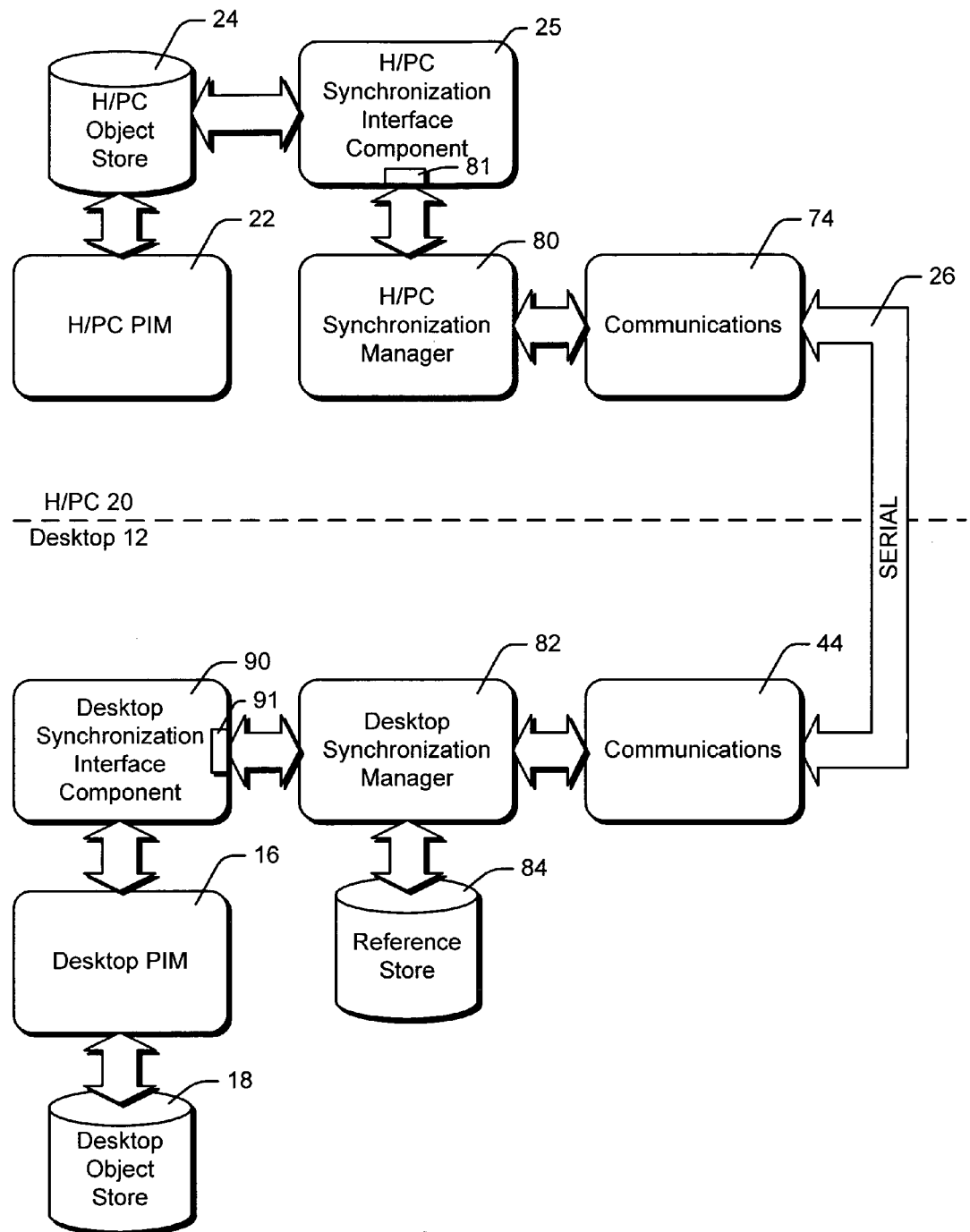
FIG. 6 is an architectural diagram of a system in accordance with the invention for synchronizing object stores maintained on two different computers.

FIG. 6 shows pertinent architectural components of both H/PC 20 and desktop computer 12 that are used to synchronize objects between desktop object store 18 and the H/PC object store 24. As discussed above, a PIM 22 executes on H/PC 20. A block 80 represents an H/PC synchronization manager, which communicates with a synchronization interface component 25. Synchronization interface component 25 communicates with the H/PC PIM application and/or H/PC object store 24. More specifically, synchronization interface component 25 exposes application programming interfaces 81 that H/PC synchronization manager 80 calls to read and store objects and object properties. Generally, the interfaces allow the creation of databases for different types of objects, and allow application programs to write and read property names and values to and from respective objects within each database. The interfaces are described in the section entitled "Application Program Interfaces and Methods, Part A" below.

Although there is a great deal of flexibility allowed in storing objects and properties in H/PC object store 24, generally a PIM creates a distinct database for each different object type. For example, different databases are created for appointments and tasks, respectively. A predefined set of properties is supported for each object type. Each database is assigned a name by the application program that creates it. Alternatively, an application program might use a single database for all object types, with the first property for each object defining the type of the object. Objects are uniquely identified within H/PC 20 by object identifiers that are independent of the names assigned by the application programs creating the objects.

Desktop PIM 16 executes on desktop computer 12 and maintains desktop information store 18. A reference store and synchronization manager 82 (referred to below simply as a synchronization manager) also executes on desktop computer 12. This component is responsible for orchestrating synchronization between objects in the H/PC object store and the desktop object store. Synchronization manager 82 maintains a reference store 84, apart from desktop object store 18.

Synchronization manager 82 is not closely associated with desktop PIM 16. Rather, it is an independent component that synchronizes objects from any application program that supports the appropriate desktop synchronization interfaces described below and in the section entitled "Application Program Interfaces and Methods, Part B" below. A number of different application programs can be supported simultaneously by synchronization manager 82.

Communications components 74 and 44 are implemented on H/PC 20 and desktop computer 12, respectively. These components implement serial communications between the computers using a serial cable or an infrared link. H/PC synchronization manager 80 communicates with desktop synchronization manager 82 through these components.

Desktop Synchronization Interface Component

Desktop synchronization manager 82 communicates with desktop PIM 16 and accesses desktop object store 18 through a desktop synchronization interface component 90, which corresponds generally to DLL 17 of FIG. 3 and which exposes one or more application program interfaces and methods 91 as described in the section entitled "Application Program Interfaces and Methods, Part B" below. The interfaces most pertinent to the invention are also described in the following general discussion.

The desktop synchronization interface component 90 is implemented specifically to work in conjunction with a particular desktop PIM. In general, providing synchronization for any particular database application requires only the development of a desktop synchronization interface component for the application. Because the application program interface 91 of synchronization component 90 is standardized, it allows synchronization manager 82 to access and synchronize any number of different desktop PIMs, as long as the required interface methods are implemented for each PIM.

In some cases, synchronization interface component 90 and its application program interface 91 might be implemented as part of the desktop PIM. In many other cases, however, they will be designed as "add-ons" or supplemental DLLs, in order to allow synchronization with an application program where synchronization is not provided as an integral feature.

Generally, the desktop synchronization interfaces allow the desktop synchronization manager to compare corresponding objects in the desktop and H/PC object stores, to receive objects from the desktop object store, and to update objects in the desktop object store. By providing these relatively simple functions, the desktop PIM is relieved of the burden of performing actual synchronization.

Identifying Data Segments

The most basic function of reference store 84 is to provide a mapping between instances of objects stored in H/PC object store 24 and desktop object store 18, although it can also provide other functionality as will be described. Objects in H/PC object store 24 are identified by object identifiers. However, these same object identifiers are not used by desktop PIM 16 to identify corresponding object instances in desktop object store 18. In most cases, in fact, PIM 16 is completely unaware that H/PC object store 24 even exists. Accordingly, some type of mapping is required between instances of the same object in the two different object stores.

To identify particular objects in the desktop object store, the invention utilizes data items referred to herein as "identifying data segments." An identifying data segment, generally, is some piece of data that can be used to identify a particular object. The exact composition of an identifying data segment is known only to the synchronization interface components, although identifying data segments are handled and stored by desktop synchronization manager 82. Thus, the developer of a desktop synchronization interface component is allowed to define the format of the identifying data segment. In most cases, an object identifier will be based at least in part on properties of the corresponding object.

Synchronization manager 82 maintains reference store 84 so that it contains identifying data segments corresponding respectively to a plurality of objects in desktop object store 18 that are to be synchronized with instances of the same objects in H/PC object store 24. In most cases, the identifying data segments in the reference store correspond to objects that have previously been synchronized between the two object stores. The identifying data segments are updated after their corresponding objects have been synchronized.

To reiterate, identifying data segments are defined solely by the synchronization interface components. Conceptually, an identifying data segment can be any collection of data that uniquely identifies a particular object in desktop object store 18. The synchronization manager does not directly examine or change the identifying data segments.

In actual implementation, the identifying data segments should be formatted in accordance with the following criteria so that the desktop synchronization interface component can perform its specified functions:

(a) Each identifying data segment should contain data that uniquely identifies an object—such as an object identifier, ID number, a full path name for a file system object, etc. This data should be persistent (not change for a particular object) and should not be reused for subsequently created objects. This data can be compared to determine whether two identifying data segments actually correspond to the same object.

(b) It should be possible to derive some object order based on the identifying data segment. This is required for efficient searching, as will be explained below.

(c) The identifying data should have some sort of time stamp information. Timestamp information can be compared to determine whether an object has changed since the last identifying data segment was recorded in reference store 84.

The identifying data segments are created by the desktop synchronization interface component and are provided to synchronization manager 82 by a desktop synchronization interface method named "ObjectToBytes". In addition to maintaining a plurality of identifying data segments, synchronization manager 82 also maintains a list of object identifiers corresponding to objects maintained in H/PC object store 24. These identifiers are provided to desktop synchronization manager 82 from H/PC synchronization manager 80 whenever a new object is added to H/PC object store 24. Desktop synchronization manager 82 also maintains a mapping or other indication of correspondence between the object identifiers and the identifying data segments (or the desktop objects to which the identifying data segments correspond).

Obtaining Handles to Objects

Most of the desktop synchronization interfaces are designed so that synchronization manager 82 can reference particular objects by using "handles." The term "handle" as used herein refers to a number or other identifier that can be used to uniquely identify an object and to access the object. Generally, a handle is valid only for a particular time period or session, such as during the time when an object has been "opened." If the same object is opened again, its handle may be different.

Note that the handles used by desktop synchronization interface component 90 do not necessarily correspond to any sort of identifiers used by desktop PIM in desktop object store 18. However, synchronization manager 82 needs to obtain a list of handles corresponding to the objects stored in desktop object store 18 before it can perform any significant synchronization tasks. These handles are provided by the exposed methods of desktop synchronization interface component 90. After obtaining handles, synchronization manager 82 determines a correspondence between the provided handles and object identifiers used by H/PC PIM 22, with reference to reference store 84.

Upon initialization, synchronization manager 82 constructs two lists of handles. The first list is obtained by submitting identifying data segments (previously stored in reference store 84) to a desktop synchronization interface named "BytesToObject." This interface stores a submitted data segment and returns a handle corresponding to the data segment. Synchronization manager 82 receives the handle and adds it to its first list. Synchronization manager 82 repeats this procedure for each identifying data segment in reference store 84, receiving a handle to each such data segment. The handles correspond respectively to objects belonging to a first group of objects that have been synchronized in the past.

The second list of handles is obtained by querying desktop synchronization interfaces named "FindFirstItem" and "FindNextItem." When successively called, these interfaces enumerate an ordered list of handles corresponding respectively to a second group of objects—those objects currently in desktop object store 18. This group of objects potentially includes at least some of the first group of objects. In fact, this second group of objects will include all objects of the first group except for those objects that have been deleted from the desktop object store since the last synchronization. The enumerated order of the handles is determined by the data in the identifying data segment.

Once the desktop synchronization manager has two lists of handles, it proceeds to match any handles of the first and second lists that correspond to the same object. It does this by repeatedly querying desktop synchronization interface "CompareItem" with pairs of handles from the first and second lists. The interface receives the two handles and returns and indication of whether the two handles correspond to the same object. In addition, for handles that do not correspond to the same object, the interface returns an indication of whether the handle from the first list falls before or after the handle from the second list, relative to the order in which handles were previously enumerated by the FindFIrstItem and FindNextItem interfaces. This allows synchronization manager 82 to implement a more efficient search algorithm as it attempts to find matching handles in the second list for all handles in the first list. However, the synchronization manager is not required to have any understanding of the contents of the identifying data segments—it just submits them to the desktop synchronization interface component for comparison.

CompareItem depends on the inclusion in the identifying data segments of some type of persistent identifier that uniquely identifies an object, and further data that can be used to derive a consistent object order based on the identifying data segments. To determine whether two identifying data segments correspond to the same object, the interface compares the unique identifying data from each data segment. If this test fails, the interface examines a portion of the data segment that is used to derive an object order. This portion of the data segment might comprise a time stamp or some other sequence indication.

Based in the comparison results, desktop synchronization manager 82 constructs and maintains a mapping between handles and object identifiers that are used in H/PC object store. These mappings are derived from mappings maintained between H/PC object identifiers and the identifying data segments maintained in reference store 84. When the synchronization manager receives an object identifier corresponding to a modified object in H/PC synchronization manager 80, the synchronization manager references the mappings with the received object identifier to identify which handle corresponds to the same object in the desktop object store.

Detecting Changes to the Desktop Object Store

If there is a particular handle in the first list that does not have a matching handle from the second list, the desktop synchronization manager concludes that the object corresponding to the particular handle has been deleted from the desktop object store since the last synchronization. Synchronization in this case requires deleting the object from the H/PC object store. On the other hand, if there is a particular handle in the second list that does not have a matching handle from the first list, the synchronization manager concludes that the object corresponding to the particular handle has been added to the desktop object store since the last synchronization. Synchronization in this case requires adding the object to the H/PC object store.

The steps described above allow desktop synchronization manager 82 to determine whether objects have been added to or deleted from the desktop object store since the last synchronization with H/PC object store 24. In addition, however, synchronization manager 82 must determine whether an object has been modified in the desktop object store. This determination is made by querying synchronization interface "IsItemChanged" with matching handles from the first and second lists. The interface compares the identifying data segment associated with each handle to determine whether the object in the desktop object store has been changed since its identifying data segment was written to the reference store. This is possible because the identifying data segment, as noted above, includes time stamp information or some similar information such as a sequence or revision number. If the timestamp information is not identical, there has been a change to the object.

Note that none of these procedures requires synchronization manager 82 to be aware of the particular nature or format of the identifying data segments or of the objects to which they correspond. Rather, interface component 90 is called upon for all actions that depend upon the actual content of the identifying data segments. It is up to the designer of interfaces 90 to define a format for the identifying data segments that will allow the interfaces to perform their required functions.

Detecting Changes to the H/PC Object Store

H/PC synchronization manager 80 is designed to maintain a status bit for each object in H/PC object store 24, indicating whether that object has been changed since the last synchronization. Whenever H/PC PIM 22 changes an object, this bit is set and the H/PC synchronization manager sends a notification to desktop synchronization manager 82 over whatever communications means are currently employed between the H/PC and the desktop computer. If there is no current communications capability, a log entry is generated so that notice of the change can be sent the next time communications are established. The status bit is reset when a return notification is received indicating that the object has been synchronized in the desktop object store.

Synchronizing Objects

Generally, there are three type of events that raise at least a potential need for synchronization:
(a) When the H/PC is first connected to the desktop computer or first establishes communications with the desktop computer.
(b) When an object is created or modified on the portable information devices while communications are established.
(c) When an object is created or modified on the desktop computer while communications are established.

When communications are first established between the H/PC and the desktop computer, there are potentially a number of modified, unsynchronized objects on the two computers. As noted above, H/PC synchronization manager 80 maintains a log of such changes. The log is provided to desktop synchronization manager 82 when communications are established. The log indicates object identifiers for the objects that have been modified, added, or deleted in the H/PC object store.

On the desktop computer, synchronization manager 82 is responsible for determining which objects have been changed in desktop object store 18. This is accomplished as described above by obtaining a list of handles representing identifying data segments stored in reference store 84 and another list of handles representing objects and corresponding identifying data segments as currently existing in desktop object store 18.

The handles are matched and compared to determine whether objects have been added, deleted, or modified since the last synchronization.

The desktop synchronization manager constructs a list of objects that have been changed in the H/PC object store and another list of objects that have been changed in the desktop object store. If a particular object has been changed in the H/PC object store, the synchronization manager performs a step of updating the desktop object store with the changed object from the H/PC object store. If a particular object has been changed in the desktop object store, the synchronization manager performs a step of updating the H/PC object store with the changed object from the desktop object store.

In some cases, an object will have changed in both object stores. If so, the user is prompted to resolve the conflict by deciding which modification should be retained. In the exemplary embodiment of the invention, the H/PC instance of the object is retrieved by desktop synchronization manager 82 from H/PC synchronization manager 80 and used to create a new object in desktop object store 18. A handle to the new object is obtained, and synchronization interface "GetConflictInfo" is queried. This interface accepts handles to two objects and returns a conflict resolution text string that is to be used to prompt a user. The text string indicates information about the two objects, such as pertinent records or timestamp information. The synchronization manager uses this text to prompt a user to decide which of the two objects should be retained. If the H/PC version of the object is selected, it replaces the desktop version. If the desktop version is selected, it is sent to the H/PC synchronization manager to overwrite the existing version of the object in H/PC object store 24.

In other cases, object modifications will occur while communications are already established. In the exemplary embodiment of the invention, synchronization takes place continuously and transparently whenever communications are established. When a modification is made on the H/PC, H/PC synchronization manager 80 immediately sends a notification to desktop synchronization manager 82, which copies the modified object to desktop object store 18 (after checking for a conflict). On the desktop side, synchronization is scheduled at periodic intervals such as every five minutes, to simulate continuous synchronization. After each interval, desktop synchronization manager 82 calls synchronization interface component 90 to enumerate a current list of handles, representing current objects in object store 18. These are then compared to the handles corresponding to identifying data segments in reference store 84 to determine whether any changes have been made since the last synchronization.

In still other cases, desktop PIM 16 might be capable of providing an immediate notice to synchronization manager 82 when an object is modified in desktop object store 18. For instance, the PIM might allow synchronization manager 82 to register a callback function. If this is the case, changes in desktop object store 18 can be synchronized as they occur, rather than at periodic intervals.

Exchanging Objects

Desktop synchronization manager 82 is designed to treat objects as arbitrary data streams. The synchronization manager does not examine objects themselves. Special interfaces are associated with both the H/PC PIM and the desktop PIM for exchanging objects. On the desktop, these interfaces are named "GetPacket" and "SetPacket". Interface method "Setup," that is used to specify a handle corresponding to an object that is to be obtained from desktop object store 18 by desktop synchronization manager 82. Once the object is specified by its handle, GetPacket is called repeatedly to retrieve a data stream representing the object. This data stream is formatted in a way that is known only to desktop synchronization interfaces 90 and to the corresponding interfaces exposed by H/PC interface component 25. SetPacket works similarly but inversely to GetPacket.

Similar interfaces are provided to work in conjunction with H/PC PIM 22. To send an object from desktop object store 18 to H/PC object store 24, desktop synchronization manager 82 calls the desktop GetPacket repeatedly to obtain a data stream representing the object. As the data stream is obtained, it is sent over the serial communications medium to H/PC synchronization manager 80. H/PC synchronization manager 80 calls the H/PC SetPacket interface, which receives the data stream and converts it into a format suitable for storage in H/PC object store 24. If the object is a new object, the object identifier assigned by H/PC synchronization manager 80 is returned to synchronization manager 82.

The reverse procedure is followed to send an object from H/PC 20 to desktop computer 12. When an object is modified in H/PC object store 24, desktop synchronization manager 82 requests the modified form of the object through communications component 88. It uses the object identifier for the object in conjunction with the mappings to determine which handle corresponds to the object in the desktop object store. It provides this handle and the modified form of the object to the desktop synchronization interface Setup, which in turn instructs desktop PIM 16 to replace the object corresponding to the identified handle with the modified object (or to add a new object if appropriate).

Updating Identifying Data Segments

Identifying data segments in reference store 84 are updated to reflect the current objects in desktop object store 18, but only after the object has been synchronized with the same object in H/PC object store 24. Updating is accomplished by providing a handle corresponding to a particular object in desktop object store 18 to a synchronization interface called "Updateitem." In response, the desktop synchronization interface component modifies the stored identifying data segment by updating its time stamp data. At a later time, the desktop synchronization manager calls interface ObjectToBytes to update the identifying data segment stored in the reference store.

Mapping Properties and Saving Unsupported Properties

Desktop synchronization interfaces 90 are responsible for mapping properties from H/PC object store 25 to corresponding properties in desktop object store 18. As described above, objects are sent to interface SetPacket as data streams. SetPacket parses the data stream, identifies particular property values, and stores at least some of the properties or property values as corresponding properties in an object of desktop object store 18. The correspondence between H/PC properties and desktop properties is determined by the designer of the desktop synchronization interface component 90. Actual storage of objects and properties in desktop object store 18 is accomplished by calling COM or other interfaces exposed by the particular desktop PIM 16.

In some cases, certain properties provided from H/PC object store 24 have no corresponding properties in desktop object store 18. Such properties are referred to herein as unsupported properties. In these cases, data representing the unsupported properties is returned to desktop synchronization manager 82 through the ObjectToBytes interface as part of the identifying data segments, without storing the properties in the desktop object store. The properties are thus stored in reference store 84 rather than in desktop object store 18. Alternatively stated, the identifying data segment for a particular object includes data representing any object properties not supported by the desktop object store. Since ObjectToBytes is invoked after updating desktop object store 18 with an object from H/PC object store 24, there is always an opportunity to update the identifying data segments with currently synchronized data.

Before retrieving a particular object from desktop object store with GetPacket, synchronization manager 82 invokes the BytesToObject interface, submitting the object's handle and its identifying data segment (which includes data representing the unsupported properties). Subsequently, GetPacket returns the object, including the unsupported properties, and the object is in turn provided to H/PC synchronization manager 80 for storage in H/PC object store 24.

General Issues

The desktop synchronization manager is configured to detect or to be notified when a portable information device has been connected for synchronization. Such notification can be generated automatically, or the user can initiate the notification.

DLLs associated with particular PIM application programs are listed in the Windows registry of the desktop computer. When a portable information device is connected, it notifies the synchronization manager of database or PIM programs that wish to participate in synchronization. The desktop synchronization manager examines the Windows registry and loads any registered DLLs that are required to synchronize database or PIM programs executing on the desktop computer. The synchronization manager also examines the registry to determine what object types are available for each DLL.

In the exemplary embodiment, each object type is represented as a "folder." An initial step performed by synchronization manager 82 is to call appropriate interfaces to obtain handles to such folders. As described in the section entitled "Application Program Interfaces and Methods, Part B" below, folder handles are used for various management purposes.

Application Program Interfaces and Methods, Part A

Object Store

About the Object Store

A Handheld PC (HPC) uses RAM to store user data, downloaded applications, and run-time data for applications. Additionally, a portion of RAM is reserved for use by the operating system. The portion that is available to applications is called the *object store*. This chapter describes the object store and the functions that an application uses to manipulate the object store.

Structure of the Object Store

The Windows CE object store supports three main groups of application programming interfaces (APIs):

- The System Registry API
- The File System API
- The Database System API

The System Registry API

The Windows CE system registry is similar to that used in the Windows NT and Windows 95 operating systems. A Windows CE application uses the standard Win32 registry functions to manipulate keys and values in the registry. For a list of the Win32 registry functions supported by Windows CE, see the "Reference Index" section at the end of this chapter.

The File System API

An application can use the Windows CE file system API to create directories and data files in the object store, read and write file data, and retrieve file and directory information. An application manipulates objects in the file system using the Win32 file system functions. For a list of the Win32 file system functions supported by Windows CE, see the "Reference Index" section at the end of this chapter.

The Database System API

The Windows CE operating system contains functions that an application can use to create and manipulate databases. Windows CE only supports databases that have a single-level hierarchy; nested objects are not supported. The object store can contain many databases, each containing any number of records. Each record can contain one or more properties. A property can be one of the following:

- A signed or unsigned integer value
- A null-terminated string

- A FILETIME structure
- An array of bytes (also called a "BLOB")

Windows CE keeps track of the databases and records in the object store using *object identifiers*. Every database and record is assigned a unique object identifier. Some database functions require an object identifier to specify the target object. An application can define a variable for holding an object identifier by using the *PEGOID* data type defined in the Windows CE header files.

Creating a Database

Each database in the object store has a name and a type identifier. The name is a null-terminated string consisting of up to 32 characters. The type identifier is a double-word value that can be used for any application-defined purpose. Typically, an application uses the type identifier to differentiate one type of database from another while enumerating the databases in the object store.

In addition to a name and a type identifier, a database can also have up to four sort orders active at one time. A sort order determines the order in which the database seek functions search through the records in a database. An application defines the sort orders by filling an array of SORTORDERSPEC structures. For more information about sort orders, see the "Sorting and Seeking Records" section of this chapter.

An application creates a database by using the PegCreateDatabase function. When calling the function, the application specifies the name and the type identifier for the database, a pointer to an array of SORTORDERSPEC structures, and a value that specifies the number of structures in the array. If no sort orders are needed, the application can specify a NULL pointer and zero structures. If the PegCreateDatabase function succeeds, the object identifier of the newly created database is returned. An application uses the identifier to open a database in order to manipulate its contents. To destroy a database, the application passes the database's object identifier to the PegDeleteDatabase function.

Enumerating Databases

The PegFindFirstDatabase and PegFindNextDatabase functions allow an application to enumerate the databases in the object store. An application begins an enumeration sequence by calling the PegFindFirstDatabase function, specifying the identifier of the type of database to enumerate. If the application specifies a valid type identifier, the enumeration sequence finds only the given type of database. If the application specifies a type identifier of zero, all databases in the object store are enumerated.

The PegFindFirstDatabase function returns a handle to an enumeration context. To find the next database of the given type, the application passes the handle to the PegFindNextDatabase function. This function returns the object identifier of the next database, not a handle. Each subsequent call to PegFindNextDatabase returns the object identifier of the next database in the enumeration sequence. When no more databases of the given type remain in the object store, PegFindNextDatabase returns the ERROR_NO_MORE_ITEMS error value.

When the application is finished enumerating databases, it must close the handle to the enumeration context by using the CloseHandle function.

Records and Properties

A database consists of a set of records, each containing one or more data fields called *properties*. For example, a Contacts application would contain a database of address records, and the properties of each record might consist of a name, street address, city, state, zip code, and telephone number. The maximum size of a record is 128K. The maximum property size is 64K.

Each property in a record has an identifier that the system uses to sort database records and to locate properties to be read or modified. A property identifier is a two part, double word value of the type *PEGPROPID*. The high order word is an application-defined identifier, and the low order word is a predefined constant value that specifies the property's data type. The constants are defined in the Windows CE header files; they begin with the PEGVT_ prefix. An application can use the TypeFromPropID macro to extract the type from a property identifier.

Opening a Database

Before an application can read, write, or delete records or properties in a database, a handle to the database must be obtained using the PegOpenDatabase function. When calling PegOpenDatabase, an application must specify either the name of the database to open, or the object identifier of the database (returned by a previous call to the PegCreateDatabase or PegFindNextDatabase function). The PegOpenDatabase function returns an open database handle that the application can use in other functions to read or make changes to the contents of the database. When the application finishes using the database, close the handle by calling the CloseHandle function.

If the application specifies the PEGDB_AUTOINCREMENT flag when calling PegOpenDatabase, the system automatically increments the seek pointer with each call to the PegReadRecordProps function. The seek pointer marks the record that will be read by the next read operation. For more information about moving the seek pointer, see the "Sorting and Seeking Records" section of this chapter.

When calling PegOpenDatabase, an application can specify the identifier of a property to use as the sort order for the open database handle. The system uses the sort order to determine where to move the seek pointer after each subsequent call to PegReadRecordProps (if the PEGDB_AUTOINCREMENT flag is specified). The sort order also determines the property that the PegSeekDatabase function uses to traverse the database. For more information about sort orders, see the "Sorting and Seeking Records" section of this chapter.

It is possible for multiple applications to have open handles to the same database at the same time. Any application that has an open handle can make changes to the database. The system can post notification messages to your application whenever another application makes a change to a database that your application has open. For example, the system will post DB_PEGOID_CREATED when another application adds a new record, or DB_PEGOID_RECORD_DELETED when a record is deleted. To get these notifications, the application must specify the handle of the window that is to receive the notifications in the call to PegOpenDatabase.

Reading and Writing Records and Properties

An application creates new records or modifies existing records using the PegWriteRecordPr ps function. The function parameters include the handle to the database and the object identifier of the record to add. If the object identifier is zero, P gWriteRec rdPr ps creates a new record.

To write properties to a record, the application fills an array of PEGPROPVAL structures and passes the address of the array to PegWriteRec rdPr ps along with the database handle and the record's object identifier. Each structure contains a property identifier and the data value for that property. To specify the data value, an application fills the val member, which is defined as a PEGVALUNION union. The PEGPROPVAL structure also includes a flag member that an application can set to PEGDB_PROPDELETE in order to delete the given property or properties. If the PegWriteRecordProps function succeeds, the object identifier of the new or modified record is returned.

The PegReadRecordProps function reads properties from the record where the seek pointer is currently positioned. When calling PegReadRecordProps, an application indicates the properties to be read by specifying an array of property identifiers. The application also specifies the buffer into which the function is to write the property information, and a value indicating the size of the buffer. If the application specifies the PEGDB_ALLOWREALLOC flag, the system will reallocate the buffer if it is too small to hold the property information. Note that the system stores records in compressed format, and must decompress records as they are read. For efficiency, an application should read all of the desired properties in a single call rather than several separate calls.

If the PegReadRecordProps function succeeds, a copy of the property information is copied into the specified buffer as an array of PEGPROPVAL structures. The return value is the object identifier of the record. If the system cannot find a requested property in the given record, the PEGPROPVAL structure for that property receives the PEGDB_PROPNOTFOUND flag. All of the variable size data such as strings and BLOBs are copied to the end of the buffer. The PEGPROPVAL structures contain pointers to this data. Before returning, PegReadRecordProps increments the seek pointer by one if the application specified the PEGDB_AUTOINCREMENT flag when it called PegOpenDatabase to open the database.

An application uses the PegDeleteRecord function to delete a record from a database, specifying the object identifier of the record, and an open handle to the database that contains the record.

Sorting and Seeking Records

Each of the records in a database typically contain a similar set of properties, and each type of property typically shares the same property identifier. For example, each record in a Contacts database might contain a name, street address, city, state, zip code, and telephone number. Each name property would have the same property identifier, each street address property would have the same property identifier, and so on. An application can select one of these properties and direct the system to sort the records based on the selected property. For example, the application can direct the system to sort the Contacts records by name, city, or state. The order in which the records are sorted affects the order in which the database seeking function PegSeekDatabase finds records in the database.

When creating a new database, an application can specify up to four different sort order descriptions to associate with the database. A *sort order description* is a SORTORDERSPEC structure that contains the identifier of a property on which the database records are to be sorted. The structure also includes a combination of flags that indicate whether to sort the records in ascending or descending order, whether the sort is case sensitive, and whether to place records that do not contain the given property before or after all other records.

An application specifies which sort order to use when it calls the PegOpenDatabase function to open a handle to the database. Only one sort order can be active for each open handle. However, by opening multiple handles to the same database, an application can use more than one sort order.

An application uses the PegSeekDatabase function to search for a record in a database. The function can perform several different types of seek operations. When calling the function, an application specifies a flag that indicates the type of seek operation to perform, and a value whose meaning depends on the specified flag. For example, to find a particular record, an application specifies the PEGDB_SEEK_PEGOID flag and the object identifier of the desired record. When PegSeekDatabase finds a record, the seek pointer is positioned at that record. Any subsequent read operation takes place at the location of the seek pointer.

Seek operations are affected by the sort order associated with the open database handle. For example, suppose the Contacts database is currently sorted based on the name property. If the application specifies the PEGDB_SEEK_VALUEFIRSTEQUAL flag and a value of "Joe Smith," the PegSeekDatabase function will search from the beginning of the database looking only at the name property of each record, and stopping when (and if) a matching property is found.

The sort orders for a database are set when the database is created. An application can change the sort order after creating a database by using the PegSetDatabaseInfo function, but this can be an extremely expensive operation in terms of system resources. It is expensive because the system maintains a set of indices and other information that it uses to optimize database searches for the given sort orders. When new sort orders are specified, the system must revise all of that internal information. Revising the information can take several minutes for large databases.

Database Information

The PegSetDatabaseInfo function allows an application to set various parameters of a database, including name, type, and sort order descriptions. An application fills a PEGDBASEINFO structure with the new database information and then passes the address of the structure and the object identifier of the database to the PegSetDatabaseInfo function.

An application can retrieve information about an object in the object store by using the PegOidGetInfo function. An application specifies the identifier of an object and the address of a PEGOIDINFO structure, which the function fills with the object information. The specific content of the structure depends on the type of the object for which information is being retrieved. For example, if the object is a database record, the structure receives the OBJTYPE_RECORD flag and a PEGRECORDINFO structure containing the object identifier of the database in which the record resides.

Using the Object Store

This section contains sample code that demonstrates how to use the Windows CE database functions to perform the following tasks:

- Create and open a database
- Write records and properties to a database
- Seek a record in a database
- Read the contents of a database record

Creating and Opening a Database

The following example attempts to open a database of addresses by calling the P gOpenDatabase function. If the database does not exist, the example calls the PegCreateDatabase function to create a new address database with three different sort orders. After creating the database, the example tries again to open the database.

```
// OpenMyDatabase - opens a database, creating a new one if one does
//    not already exist.
// Returns TRUE if successful or FALSE otherwise.
// notifyWindow - handle of window that is notified when a message is
//    added or deleted
// sortProperty - identifier of property on which to sort the database
//
// Global variables:
//    g_oidAddressDatabase - object identifier of address database
//    g_hAddressDatabase - open handle to the address database BOOL OpenAddressDatabase (HWND hwndNotify, PEGPROPID pegpidSortProperty)
{
    PEGOID oidAddressDatabase; // Object identifier of address database
    SORTORDERSPEC sort[MAX_MSG_PROPERTIES]; // Sort order descriptions // Attempt to open the database of addresses. If successful, the
    // function returns an open  handle to the database and fills
    // oidAddressDatabase with the object identifier of the address
    // database.
    g_hAddressDatabase = PegOpenDatabase(&oidAddressDatabase,
        TEXT("Addresses"), pegpidSortProperty, 0, hwndNotify);

// Check to see if the database handle is valid. If not, the
    // database must not exist. Define the sort orders and create the
    // address database.
    if (g_hAddressDatabase == INVALID_HANDLE_VALUE) { // could not open // Define the sort orders.
        sort[0].propid = HHPR_LAST_NAME;
        sort[0].dwFlags = 0;   // sort in ascending order
        sort[1].propid = HHPR_CITY;
        sort[1].dwFlags = 0;   // sort in ascending order
        sort[2].propid = HHPR_STATE;
        sort[2].dwFlags = 0;   // sort in ascending order // Create the database.
        g_oidDatabase = PegCreateDatabase(TEXT("Addresses"), 0,
            MAX_MSG_PROPERTIES, sort);

// Open the database.
        g_hAddressDatabase = PegOpenDatabase(&oidAddressDatabase, NULL, pegpidSortProp
            NULL);
    } if (!g_hAddressDatabase)
        return FALSE;

return TRUE;
}
```

Writing Record Properties

You write a record into a database by filling an array of PEGPROPVAL structures and passing the array to the PegWriteRec rdProps function, along with an open handle to the database in which to add the record. The following example shows how to add a record to a database:

```
// SetAddressData - Adds a name and address to an address database in
//   the object store.
// Returns the object identifier of the record in which the name and
//   address are written.
// pAddressData - pointer to a structure that contains the name and
//   address to add
//
// Global variable:
//     g_hAddressDatabase - open handle to the address database PEGOID SetAddressData(PADDRESSDATA pAddressData)
{
    PEGPROPVAL rgPropVal[ADDRESS_PROP_COUNT];
    WORD wCurrent = 0;

// Use a C runtime function to zero-fill the array of property
    // values.
    memset(&rgPropVal, 0, sizeof(PEGPROPVAL) * ADDRESS_PROP_COUNT);

// Name
    rgPropVal[wCurrent].propid = HHPR_NAME;
    rgPropVal[wCurrent++].val.lpwstr = pAddressData->pwszName;

// Street
    rgPropVal[wCurrent].propid = HHPR_STREET;
    rgPropVal[wCurrent++].val.lpwstr = pAddressData->pwszStreet;

// City
    rgPropVal[wCurrent].propid = HHPR_CITY;
    rgPropVal[wCurrent++].val.lpwstr = pAddressData->pwszCity;

// State
    rgPropVal[wCurrent].propid = HHPR_STATE;
    rgPropVal[wCurrent++].val.lpwstr = pAddressData->pwszState;

// Zip code
    rgPropVal[wCurrent].propid = HHPR_ZIP_CODE;
    rgPropVal[wCurrent++].val.ulVal = pAddressData->dwZip;

oid = PegWriteRecordProps(g_hAddressDatabase, 0, wCurrent,
        rgPropVal);

return oid;
}
```

Seeking and Reading a Database Record

The following example shows how to find a record in a database and read its properties into a buffer. The example consists of a function, GetAddressData, that takes two parameters: the object identifier of a record, and a pointer to an application-defined ADDRESSDATA structure that receives the record's property data. First, the GetAddr ssData function allocates a temporary buffer for the property data, and then it calls the P gSeekDatabase function to find the record that has the given object identifier. If the record is found, the PegReadRec rdPr ps function reads the property data into the temporary buffer. Finally, the property data is copied from the temporary buffer into the application-defined ADDRESSDATA structure:

```
// GetAddressData - retrieves the contents of an address record
// Returns a code that indicates the success or failure of the function
// oidSeek - object identifier of the record to seek
// pAddressData - pointer to an application-defined ADDRESSDATA
//   structure that receives the data from the address record
//
// Global variable:
//     g_hAddressDatabase - open handle to the address database ECODE GetAddressData(PEGOID oidSeek, PADDRESSDATA pAddressData)
{
    LPBYTE lpBuffer;         // Buffer for address record
    WORD wSize = 1024;       // Size of buffer
    PEGOID oid;              // Object identifier of record found or read
    DWORD dwIndex;           // Index of record seeked to
    WORD wCount;             // Number of properties in record
    int i;                   // Loop counter
    PEGPROPID propid;        // Property identifier
    WORD wLength;            // String length
    ECODE ec = EC_SUCCESS;   // Error/success code // Allocate buffer for record data.
    lpBuffer = (LPBYTE) LocalAlloc(LMEM_FIXED, wSize);
    if (!lpBuffer)
        return EC_OUTOFMEMORY;

// Seek to the record.
    oid = PegSeekDatabase(g_hAddressDatabase, PEGDB_SEEK_PEGOID,
        oidSeek, &dwIndex);
    if (!oid)
        return EC_SEEK_FAILURE;

// Read the record.
    oid = PegReadRecordProps(g_hAddressDatabase, PEGDB_ALLOWREALLOC,
        &wCount, NULL, &lpBuffer, &wSize);
    if (!oid)
        return EC_READ_FAILURE;

// Fill ADDRESSDATA structure with the data from the address
    // record.
    for (i = 0; i < wCount; i++ ) {
        propid = ((PEGPROPVAL*) lpBuffer)[i].propid;

// Switch only on the upper word.
        switch (propid) {
            case HHPR_NAME:
            {
                // Copy the addressee's name.
                TCHAR* pData;
```

```
            wLength =
                lstrlen(((PEGPROPVAL*) lpBuffer)[i].val.lpwstr);
            pData = (TCHAR*) LocalAlloc(LMEM_FIXED,
                wLength * sizeof(TCHAR) + 1);
            if (pData) {
                lstrcpy(pData,
                    ((PEGPROPVAL*) lpBuffer)[i].val.lpwstr);
                pAddressData->pwszName = pData;
            } else {
                ec = EC_OUTOFMEMORY;
            }
        }
        break;

case HHPR_STREET:
        {

// Copy the addressee's street address.
            TCHAR* pData;

wLength =
                lstrlen(((PEGPROPVAL*)lpBuffer)[i].val.lpwstr);
            pData = (TCHAR*) LocalAlloc(LMEM_FIXED,
                wLength * sizeof(TCHAR) + 1, FALSE);
            if (pData) {
                lstrcpy(pData,
                    ((PEGPROPVAL*) lpBuffer)[i].val.lpwstr);
                pTaskData->pwszDescription = pData;
            } else {
                ec = EC_OUTOFMEMORY;
            }
        }
        break;

.
        .    // Copy the remaining record properties to the
        .    // ADDRESSDATA structure.

default:
            break;
        } if (ec != EC_SUCCESS)
            break;
    }

// Free the record buffer.
    if (lpBuffer)
        LocalFree(lpBuffer);

return ec;
}
```

Reference Index

Following ar the registry, file system, and database functions and messages supported by the Windows CE operating system. For a description of the registry and file system functions, see the *Win32 Programmer's Reference*. For a description of the database functions, see the Wind ws CE SDK Programmer's Reference.

Registry Functions

- RegCloseKey
- RegCreateKeyEx
- RegDeleteKey
- RegDeleteValue
- RegEnumKeyEx
- RegEnumValue
- RegOpenKeyEx
- RegQueryInfoKey
- RegQueryValueEx
- RegSetValueEx

File System Functions

- CopyFile
- CreateDirectory
- CreateFile
- DeleteFile
- FindClose
- FindFirstFile
- FindNextFile
- FlushFileBuffers
- GetFileAttributes
- GetFileInformationByHandle
- GetFileSize
- GetFileTime
- MoveFile
- ReadFile
- RemoveDirectory
- SetEndOfFile
- SetFilePointer
- SetFileTime
- WriteFile

Database and Object Store Functions

- PegCreateDatabase
- PegDel teDatabase
- PegFindFirstDatabase
- PegFindNextDatabase
- PegOidGetInfo
- PegOpenDatabase
- PegReadRecordProps
- PegSeekDatabase
- PegSetDatabaseInfo
- PegWriteRecordProps

Messages

- DB_PEGOID_CHANGED
- DB_PEGOID_CREATED
- DB_PEGOID_DATABASE_DELETED
- DB_PEGOID_DIRECTORY_DELETED
- DB_PEGOID_FILE_DELETED
- DB_PEGOID_RECORD_DELETED

PegCreateDatabase

The PegCreateDatabase function creates a new database. A RAPI version of this function exists and is also called PegCreateDatabas . For more information about using RAPI functions, please see the Remote API Functions overview.

| | |
|---|---|
| PEGOID PegCreateDatabase( | // rapi.h and windbase.h |
|     LPWSTR *lpszName*, | // pointer to name of database |
|     DWORD *dwDbaseType*, | // type of the database |
|     WORD *wNumSortOrder*, | // number of active sort orders |
|     SORTORDERSPEC \* *rgSortSpecs* | // pointer to array of sort order descriptions |
| ); | |

Parameters

*lpszName*
    Points to a null-terminated string that specifies the name for the new database. The name can have up to 32 characters, including the terminating null character. If the name is too long, it is truncated.

*dwDbaseType*
    Specifies the type identifier for the database. This is an application-defined value that can be used for any application-defined purpose. For example, an application can use the type identifier to distinguish address book data from to-do list data, or use the identifier during a database enumeration sequence (see the description of PegFindFirstDatabase for details). The type identifier is not meant to be a unique identifier for the database. The system does not use this value.

*wNumSortOrder*
    Specifies the number of sort orders active in the database, with four being the maximum number. This parameter can be zero if no sort orders are active.

*rgSortSpecs*
    Points to an array of actual sort order descriptions. The size of the array is specified by *wNumSortOrder*. This parameter can be NULL if *wNumSortOrder* is zero.

Return Values

If the function succeeds, the return value is the object identifier of the newly created database (not a handle to an open database). If the function fails, the return value is NULL. To get extended error information, call GetLastError. GetLastError may return one of the following error codes.

| Value | Meaning |
|---|---|
| ERROR_DISK_FULL | The object store does not contain enough space to create the new database. |
| ERROR_INVALID_PARAMETER | A parameter was invalid. |
| ERROR_DUP_NAME | A database already exists with the specified name. |

To get extended error information for the RAPI version of the API, call PegGetLastError.

Remarks

Because sort orders increase the system resources needed to perform each insert and delete operation, you should keep the number of sort orders to a minimum. However, try not to specify too few sort orders. If you do, you can use the PegSetDatabaseInfo function to change the sort order later; however, this function is even more expensive in terms of system resources.

See Also

**Object St re, PegDeleteDatabase, P gOidGetInfo, PegOpenDatabase, PegSetDatabaseInf ,
SORTORDERSPEC**

PegDeleteDatabase

The PegDeleteDatabase function removes a database from the object store. A RAPI version of this function exists and is also called PegDeleteDatabase. For more information about using RAPI functions, please see the Remote API Functions overview.

BOOL P gDeleteDatabase(      // rapi.h and windbase.h
     PEGOID *oidDbase*      // object identifier of database
);

Parameters

*oidDbase*
    Object identifier of the database to be deleted.

Return Values

If the function succeeds, the return value is TRUE. If the function fails, the return value is FALSE. To get extended error information, call GetLastError. GetLastError may return one of the following error codes.

| Value | Meaning |
|---|---|
| ERROR_INVALID_PARAMETER | A parameter was invalid. |
| ERROR_SHARING_VIOLATION | Another thread has an open handle to the database. |

To get extended error information for the RAPI version of this function, call PegGetLastError.

Remarks

This function deletes a database, including all records in the database.

See Also

Object Store, PegCreateDatabase, PegOidGetInfo

PegDeleteRecord

The PegDeleteRecord function deletes a record from a database. A RAPI version of this function exists and is also called PegDeleteRecord. For more information about using RAPI functions, please see the R mote API Functions overview.

| | |
|---|---|
| BOOL P gDeleteRecord( | // rapi.h and windbase.h |
|     HANDLE *hDatabase,* | // handle to database |
|     PEGOID *oidRecord* | // object identifier of record |
| ); | |

Parameters

*hDatabase*
    Identifies the database from which the record is to be deleted. The database must be open. An application opens a database by calling the PegOpenDatabase function.

*oidRecord*
    Object identifier of the record to be deleted; this is obtained from PegOpenDatabase.

Return Values

If the function succeeds, the return value is TRUE. If the function fails, the return value is FALSE. To get extended error information, call GetLastError. GetLastError may return ERROR_INVALID_PARAMETER if the handle or object identifier is invalid.

To get extended error information for the RAPI version of this function, call PegGetLastError.

Remarks

Deleting a record is an O(n) operation. If the PEGDB_AUTOINCREMENT flag was not specified when the database was opened, and the record being deleted is the current record, the next read operation that uses the database handle will fail. If the PEGDB_AUTOINCREMENT flag was specified, the system automatically moves the current seek pointer forward by one.

See Also

PegOpenDatabase

PegFindFirstDatabase

The PegFindFirstDatabase function opens an enumeration context for all databases in the system. A RAPI version of this function exists and is also called PegFindFirstDatabas . For more information about using RAPI functions, please see the Remote API Functi ns overview.

| | |
|---|---|
| HANDLE PegFindFirstDatabas ( | // rapi.h and windbase.h |
|     DWORD *dwDbaseType* | // type identifier of database |
| ); | |

Parameters

*dwDbaseType*
    Specifies the type identifier of the databases to enumerate. If this parameter is zero, all databases are enumerated.

Return Values

If the function succeeds, the return value is a handle to an enumeration context. To find the next database of the given type, specify the handle in a call to the PegFindNextDatabase function. If the function fails, the return value is INVALID_HANDLE_VALUE. To get extended error information, call GetLastError. GetLastError may return ERROR_OUTOFMEMORY if no memory is available to allocate a database handle.

To get extended error information for the RAPI version of this function, call PegGetLastError.

Remarks

An application must use CloseHandle to close the handle returned by PegFindFirstDatabase.

If the corresponding RAPI verison of PegFindFirstDatabase is called, then the handle must be closed with PegCloseHandle.

See Also

Object Store, PegCloseHandle, PegFindNextDatabase

PegFindNextDatabase

The P gFindNextDatabase retrieves the next database in an enumeration context. A RAPI version of this function exists and is also called PegFindNextDatabase. For more information about using RAPI functions, please see the Remote API Functions overview.

| | |
|---|---|
| PEGOID PegFindNextDatabase( | // rapi.h and windbase.h |
|     HANDLE *hEnum* | // handle to enumeration context |
| ); | |

Parameters

*hEnum*
    Identifies an enumeration context; this handle is returned from PegFindFirstDatabase.

Return Values

If the function succeeds, the return value is the object identifier of the next database to be enumerated. If no more databases are left to enumerate, or if an error occurs, the return value is zero. To get extended error information, call GetLastError. GetLastError may return one of the following error codes.

| Value | Meaning |
|---|---|
| ERROR_NO_MORE_ITEMS | The object store contains no more databases to enumerate. |
| ERROR_INVALID_PARAMETER | The *hEnum* parameter specified an invalid handle. |

To get extended error information for the RAPI version of this function, call PegGetLastError.

See Also

PegFindFirstDatabase, Object Store

PegOidGetInfo

The PegOidGetInfo function retrieves information about an object in the object store. A RAPI version of this function exists and is also called P gOidGetInfo. For more information about using RAPI functions, please see the Remote API Functions overview.

| | |
|---|---|
| BOOL PegOidGetInf ( | // rapi.h and windbase.h |
|     PEGOID *oid*, | // object identifier |
|     PEGOIDINFO **poidInfo* | // pointer to object information |
| ) ; | |

Parameters

*oid*
    Identifier of the object for which information is to be retrieved.

*poidInfo*
    Points to a PEGOIDINFO structure that contains information about the object.

Return Values

If the function succeeds, the return value is TRUE. If the function fails, the return value is FALSE. To get extended error information, call GetLastError. GetLastError may return ERROR_INVALID_HANDLE if the given object identifier is invalid.

To get extended error information for the RAPI version of this function, call PegGetLastError.

Remarks

An application can use this function to retrieve information about any object in the object store database or file system.

See Also

Object Store, PEGOIDINFO, PegCreateDatabase, PegOpenDatabase

PegOpenDatabase

The PegOpenDatabase function opens an existing database. A RAPI version of this function exists and is also called PegOpenDatabase. For more information about using RAPI functions, please see the Remote API Functions overview.

| | |
|---|---|
| HANDLE PegOpenDatabase( | // rapi.h and windbase.h |
| PPEGOID *poid*, | // pointer to object identifier of database to be opened |
| LPWSTR *lpszName*, | // pointer to database name |
| PEGPROPID *propid*, | // pointer to property identifier |
| DWORD *dwFlags*, | // action flags |
| HWND *hwndNotify* | // handle to window for modify notifications |
| ); | |

Parameters

*poid*
    Points to the object identifier of the database to be opened. To open a database by name, set the value pointed to by *poid* to zero to receive the object identifer of the newly opened database when a database name is specified for *lpszName*.

*lpszName*
    Points to the name of the database to be opened. This parameter is ignored if the value pointed to by *poid* is non-zero.

*propid*
    Specifies the property identifier of the primary key for the sort order in which the database is to be traversed. All subsequent calls to PegSeekDatabase assume this sort order. This parameter can be zero if the sort order is not important.

*dwFlags*
    Specifies an action flag. The following values are supported.

| Value | Meaning |
|---|---|
| PEGDB_AUTOINCREMENT | Causes the current seek position to be automatically incremented with each call to the PegReadRecordProps function. |
| 0 (ZERO) | Current seek position is not incremented with each call to the PegReadRecordProps function |

*hwndNotify*
    Identifies the window to which notification messages (DB_PEGOID_*) will be posted if another thread modifies the given database while your application has it open. This parameter can be NULL if your application does not need to receive notifications.

Return Values

If the function succeeds, the return value is a handle to the open database. If the function fails, the return value is INVALID_HANDLE_VALUE. To get extended error information, call GetLastError. GetLastError may return one of the following error codes.

To get extended error information for the RAPI version of this function, call PegGetLastError.

| Value | Meaning |
|---|---|

| | |
|---|---|
| ERROR_INVALID_PARAMETER | A parameter was invalid. |
| ERROR_FILE_NOT_FOUND | No database exists with the specified name. This error code applies only if the value pointed to by *poid* was set to NULL (or zero) when the function was called. |
| ERROR_NOT_ENOUGH_MEMORY | No memory was available to allocate a database handle. |

Remarks

An application must use CloseHandle to close the handle returned by PegOpenDatabase. If the corresponding RAPI verison of PegOpenDatabase is called, then the handle must be closed with PegCloseHandle.

Unlike many other traditional databases, opening and closing a database does not imply any transactioning. In other words, the database is not committed at the closing—it is committed after each individual call.

See Also

Object Store, PegCloseHandle, PegCreateDatabase, PegSeekDatabase

PegReadRecordProps

The PegReadRecordProps function reads properties from the current record. A RAPI version of this function exists and is also called PegReadRecordProps. For more information about using RAPI functions, please see the Remote API Functions overview.

| | |
|---|---|
| PEGOID P gReadR cordPr ps( | // rapi.h and windbase.h |
| HANDLE *hDbase*, | // handle to open database |
| DWORD *dwFlags*, | // read flags |
| LPWORD *lpcPropID*, | // number of property identifiers in array |
| PEGPROPID \* *rgPropID*, | // pointer to array of property identifiers |
| LPBYTE \* *lplpBuffer*, | // address of pointer to buffer for property information |
| LPDWORD *lpcbBuffer* | // pointer to size, in bytes, of buffer |
| ); | |

Parameters

*hDbase*
    Identifies an open database. The database must have been opened by a previous call to the PegOpenDatabase function.

*dwFlags*
    Specifies the read flags. Currently, only the following value is supported.

| Value | Meaning |
|---|---|
| PEGDB_ALLOWREALLOC | Indicates that the LocalAlloc function was used to allocate the buffer specified by the *lplpBuffer* parameter, and that the server can reallocate the buffer if it is not large enough to hold the requested properties. |

*lpcPropID*
    Indicates the number of property identifiers in the array specified by the *rgPropID* parameter. If *rgPropID* is NULL, this parameter receives the number of properties retrieved.

*rgPropID*
    Points to an array of property identifiers for the properties to be retrieved. If this parameter is NULL, the function retrieves all properties in the record.

*lplpBuffer*
    Address of a pointer to a buffer that receives the requested properties. If the *dwFlags* parameter includes the PEGDB_ALLOWREALLOC flag, the buffer may be reallocated if necessary. If the PEGDB_ALLOWREALLOC flag is specified and this parameter is NULL, the server uses the LocalAlloc function to allocate a buffer of the appropriate size in the caller's address space and returns a pointer to the buffer. Note that if the PEGDB_ALLOWREALLOC flag is specified it is possible for the value of this pointer to change even on failure. For example, the old memory might be freed and the allocation might then fail, leaving the pointer set to NULL. Memory allocated by the RAPI version of the API must be released by calling RapiFreeBuffer.

*lpcbBuffer*
    Points to a variable that cointains the size, in bytes, of the buffer specified by the *lplpBuffer* parameter. When the function returns, *lpcbBuffer* receives a value that indicates the actual size of the data copied to the buffer. If the buffer was too small to contain the data, this parameter can be used to calculate the amount of memory to allocate for the buffer if
PEGDB_ALLOWREALLOC was not specified.

Return Values

If the function succeeds, the return value is the object identifier of the record from which the function read. If the function fails, the return value is zero. To get extended error information, call PegGetLastError. PegGetLastErr r may return one of the following error codes.

| Value | Meaning |
|---|---|
| ERROR_INVALID_PARAMETER | A parameter was invalid. |
| ERROR_NO_DATA | None of the requested properties was found. The output buffer and the size are valid. |
| ERROR_INSUFFICIENT_BUFFER | The given buffer was not large enough, and the reallocation failed (if the PEGDB_ALLOWREALLOC flag was specified). The *lpcbBuffer* parameter contains the required buffer size. |
| ERROR_KEY_DELETED | The record that was about to be read was deleted by another thread. If the current record was reached as a result of an autoseek, this error is not returned, and the next record is returned. |
| ERROR_NO_MORE_ITEMS | The current seek pointer is at the end of the database. |

To get extended error information for the RAPI version of this function, call PegGetLastError.

Remarks

The PegReadRecordProps function reads the specified set of properties from the current record. If the database was opened with the autoseek flag (that is, if the *dwFlags* parameter of PegOpenDatabase was set to PEGDB_AUTOINCREMENT), the function increments the seek pointer by one so that the next call reads the next record in the current sort order. That is, if the database was opened with a sort order active, then PegReadRecordProps will return the records in sorted order. If the database was not opened with a sort order active, then the order in which records are returned is not predictable.

An application should read all needed properties from the record in a single call. This is because the entire record is stored in a compressed format, and each time a property is read it must be decompressed. All the properties are returned in a single marshalled structure, which consists of an array of PEGPROPVAL structures, one for each property requested (or one for each property found if the application set the *rgPropID* parameter to NULL when calling the function).

If a property was requested, such as strings or blobs that are packed in at the end of the array, the pointers in the PEGPROPVAL structures point into this marshalled structure. This means that the only memory that must be freed is the original pointer to the buffer passed in to the call. Even if the function fails, it may have allocated memory on the caller's behalf. An application must free the pointer returned by this function if the pointer is not NULL.

See Also

Object Store, LocalAlloc, LocalFree, PegOpenDatabase, PegSeekDatabase, PEGPROPVAL

PegSeekDatabase

The PegS ekDatabase function seeks the specified record in an open database. A RAPI version of this function exists and is also called PegSeekDatabase. For more information about using RAPI functions, please see the Remote API Functi ns overview.

| | |
|---|---|
| PEGOID PegSeekDatabase( | // rapi.h and windbase.h |
|     HANDLE *hDatabase*, | // handle to open database |
|     DWORD *dwSeekType*, | // seek type flags |
|     DWORD *dwValue*, | // type-dependent value |
|     LPDWORD *lpdwIndex* | // index to seek value |
| ); | |

Parameters

*hDatabase*
    Identifies the open database in which to seek.

*dwSeekType*
    Indicates the type of seek operation to perform. This parameter can be one of the following values.

| Value | Description |
|---|---|
| PEGDB_SEEK_PEGOID | Seek until finding an object that has the given object identifier. The *dwValue* parameter specifies the object identifier. This type of seek operation is very efficient. |
| PEGDB_SEEK_VALUESMALLER | Seek until finding the largest value that is smaller than the given value. If none of the records has a smaller value, the seek pointer is left at the end of the database and the function returns zero. The *dwValue* parameter is a pointer to a PEGPROPVAL structure. The cost of this type of operation is O(n). |
| PEGDB_SEEK_VALUEFIRSTEQUAL | Seek until finding the first value that is equal to the given value. If the seek operation fails, the seek pointer is left pointing at the end of the database, and the function returns zero. The *dwValue* parameter is a pointer to a PEGPROPVAL structure. The cost of this type of operation is O(n). |
| PEGDB_SEEK_VALUENEXTEQUAL | Starting from the current seek position, seek exactly one position forward in the sorted order and check if the next record is equal in value to the given value. If so, return the object identifier of this next record; otherwise, return zero and leave the seek pointer at the end of the database. This operation can be used in conjunction with the PEGDB_SEEK_VALUEFIRSTEQUAL operation to enumerate all records with an equal value. The *dwValue* parameter specifies the value for which to seek. This is a O(1) operation. |

| | |
|---|---|
| PEGDB_SEEK_VALUEGREATER | Seek until finding a value greater than or equal to the given value. If all records are smaller, the seek pointer is left at the end of the database and the function returns zero. The *dwValue* parameter is a pointer to a PEGPROPVAL structure. The cost of this type of operation is O(n). |
| PEGDB_SEEK_BEGINNING | Seek until finding the record at the given position from the beginning of the database. The *dwValue* parameter specifies the number of of the records to seek. The cost of this type of operation is O(*dwValue*). |
| PEGDB_SEEK_CURRENT | Seek backward or forward from the current position of the seek pointer for the given number of records. The *dwValue* parameter specifies the number of records from the current position. The function seeks forward if *dwValue* is a positive value, or backward if it is negative. A forward seek operation is efficient. The cost of a backward seek is O(n). |
| PEGDB_SEEK_END | Seek backward for the given number of records from the end of the database. The *dwValue* parameter specifies the number of records. The cost of this type of operation is O(n). |

*dwValue*
   Specifies a value to use for the seek operation. The meaning of this parameter depends on the value of *dwSeekType*.

*lpdwIndex*
   Points to a variable that receives the index from the start of the database to the beginning of the record that was found.

Return Values

If the function succeeds, the return value is the object identifier of the record on which the seek ends. If the function fails, the return value is zero. To get extended error information, call GetLastError. GetLastError may return ERROR_INVALID_PARAMETER if a parameter is invalid.

To get extended error information for the RAPI version of this function, call PegGetLastError.

Remarks

The PegSeekDatabase function always uses the current sort order as specified in the call to the PegOpenDatabase function. If the PEGDB_AUTOINCREMENT flag was specified, an automatic seek of one from the current position is done with each read operation that occurs on the database.

Note that a seek can only be performed on a sorted property value. After creating a database (using PegCreateDatabase) and opening the database (using PegOpenDatabase), subsequent calls to PegSeekDatabase assume the sort order that was specified in the *propid* parameter of the call to PegOpenDatabase. Although property identifiers can be modified using PegWriteRecordProps, it is best to use the same property identifier for PegOpenDatabase that was used in for the *propid* member of the SORTORDERSPEC structure that was passed in the call to PegCreateDatabase.

See Also

Obj ct Store, P gCreateDatabase, PegOpenDatabase, PEGPROPVAL

PegSetDatabaseInfo

The PegSetDatabaseInfo function sets various database parameters, including the name, type, and sort-order descriptions. A RAPI version of this function exists and is also called PegSetDatabaseInf . For more information about using RAPI functions, please see the R m te API Functi ns overview.

| | |
|---|---|
| BOOL PegSetDatabaseInfo( | // rapi.h and windbase.h |
|     PEGOID *oidDbase*, | // object identifier of database |
|     PEGDBASEINFO *\*pNewInfo* | // pointer to structure with database information |
| ); | |

Parameters

*oidDbase*
    Specifies the object identifier of the database for which parameter are to be set.

*pNewInfo*
    Points to a PEGDBASEINFO structure that contains new parameter information for the database. The wNumRecords member of the structure is not used.

Return Values

If the function succeeds, the return value is TRUE. If the function fails, the return value is FALSE. To get extended error information, call GetLastError. GetLastError may return one of the following error codes.

| Value | Meaning |
|---|---|
| ERROR_INVALID_PARAMETER | A parameter was invalid. |
| ERROR_DISK_FULL | The object store is full and any size changes required could not be accomodated. Changing sort orders can change the size of the stored records, though not by much. |
| ERROR_SHARING_VIOLATION | The function tried to remove a sort order that is being used by a currently open database. |

To get extended error information for the RAPI version of this function, call PegGetLastError.

Remarks

This function can be used to change the database parameters passed in while creating the database. Note that changing the sort order of the database is a very expensive operation—potentially of the order of a few minutes. Before calling this function, an application should warn the user that this operation may be lengthy.

See Also

Object Store, PegCreateDatabase, PEGDBASEINFO, PegOidGetInfo

PegWriteRecordProps

The PegWriteRecordProps function writes a set of properties to a single record, creating the record if necessary.

A RAPI version of this function exists and is also called PegWriteRec rdPr ps. For more information about using RAPI functions, please see the Rem te API Functi ns overview.

| | |
|---|---|
| PEGOID PegWriteRecordProps( | // rapi.h and windbase.h |
|    HANDLE *hDbase*, | // handle of open database |
|    PEGOID *oidRecord*, | // object identifier of record |
|    WORD *cPropID*, | // number of property values in array |
|    PEGPROPVAL *\*rgPropVal* | // array of property values |
| ); | |

Parameters

*hDbase*
> Identifies an open database. The database must have been opened by a previous call to the PegOpenDatabase function.

*oidRecord*
> Object identifier of the record to which the given properties are to be written. If this parameter is zero, a new record is created and filled in with the given properties.

*cPropID*
> Indicates the number of properties in the array specified by the *rgPropVal* parameter. The *cPropID* parameter must not be zero.

*rgPropVal*
> Points to an array of PEGPROPVAL structures that specify the property values to be written to the given record.

Return Values

If the function succeeds, the return value is the object identifier of the record to which the properties were written. If the function fails, the return value is zero. To get extended error information, call GetLastError. GetLastError may return one of the following error codes.

| Value | Meaning |
|---|---|
| ERROR_DISK_FULL | There was not enough space in the object store to write the properties. |
| ERROR_INVALID_PARAMETER | A parameter was invalid. |

To get extended error information for the RAPI version of this function, call PegGetLastError.

Remarks

The PegWriteRecordProps function writes all the requested properties into the specified record. The function does not move the seek pointer.

The cost of calling this function goes up if any of the sort order properties are changed.

To delete a property, set the PEGDB_PROPDELETE flag in the appropriate property value. This allows multiple deletes and changes in a single call, which is much more efficient than multiple calls.

No memory is freed by the callee. Pointers in the PEGPROPVAL structures can be anywhere in the caller's address space—they can be marshalled in like the array returned by PegReadRecordProps, or they can be independently allocated.

See Also

Object Store

Application Program Interfaces and Methods, Part B

*uFlags*
　See PSA_???.

Return Value

Returns NOERROR if supported.

Remarks

Replication will call this method to signal the client to abort whatever it's doing. It typically happens when user disconnect the connection between the H/PC and PC so replication needs to shut down. Client should return from a lengthy routine as soon as possible after this method is called.

See Also

IReplStore

IReplStore::ActivateDialog

Activate a client-specific dialog.

Syntax

HRESULT ActivateDialog(
　UINT *uDlg,*
　HWND *hwndParent,*
　HREPLFLD *hFolder,*
　IEnumReplItem \* *penum*
);.

Parameters

*uDlg*
　Which dialog should be actiavted.

*hwndParent*
　Handle of the window that should be used as parent for the dialog.

*hFolder*
　Folder Handle.

*penum*
　Points to a enumerator of HREPLITEM for objects stored in the folder.

Return Value

Returns one of the following values:
　NOERROR

User selected OK to save the changes made.

RERR_CANCEL
　　User selected CANCEL to ignore the changes made.

RERR_SHUT_DOWN
　　User selected OK to save the changes made. And the H/PC Manager must be closed now, because of these changes.

RERR_UNLOAD
　　User selected OK to save the changes made. And Replication modules must be unloaded so the change can take effect.

›IReplStore

An interface that implements all required functions related to the store.

Methods

| IUnknown Methods | Description |
|---|---|
| IUnknown::QueryInterface | Returns pointers to supported interfaces. |
| IUnknown::AddRef | Increments reference count. |
| IUnknown::Release | Decrements reference count. |

| IReplStore Methods | Description |
|---|---|
| IReplStore::ActivateDialog | Activate a client-specific dialog |
| IReplStore::BytesToObject | Convert an array of bytes to a HREPLOBJ, which can be either a HREPLITEM or HREPLFLD, when loading. |
| IReplStore::CompareItem | Compare the given handles of two items using things like entry ID or file name or record number. |
| IReplStore::CopyObject | Copy one HREPLOBJ, which can be either a HREPLITEM or HREPLFLD, over to another |
| IReplStore::FindFirstItem | Return a new HREPLITEM of the first object in the given folder, if there's any. |
| IReplStore::FindItemClose | Complete the Find operation in the given folder |
| IReplStore::FindNextItem | Return a new HREPLITEM of the next object in the given folder, if there's any. |
| IReplStore::FreeObject | Free the given HREPLOBJ, which can be either a HREPLITEM or HREPLFLD. |
| IReplStore::GetConflictInfo | Get information about two conflicting objects |
| IReplStore::GetFolderInfo | Returns a HREPLFLD for folder, given the object type name. Also returns a pointer to IReplObjHandler of the given object type. |
| IReplStore::GetObjTypeUIData | Send UI related data about an object type to the server. |
| IReplStore::GetStoreInfo | Get information about the current store instance |
| IReplStore::Initialize | Initialize the client |
| IReplStore::IsFolderChanged | Check if any object in the folder has been changed since the method is called last time |
| IReplStore::IsItemChanged | Check if the item is changed. |
| IReplStore::IsItemReplicated | Check if the item should be replicated using client defined rules |
| IReplStore::IsValidObject | Check if the given HREPLOBJ is valid. |
| IReplStore::ObjectToBytes | Convert the HREPLOBJ, which can be either a HREPLITEM or HREPLFLD, to an array of bytes when saving. |
| IReplStore::ReportStatus | Server is reporting to the store about certain operations |
| IReplStore::UpdateItem | Update the item's time-stamp, change number, etc that is identified by the given handle. |

Remarks

This interface encapsulates all functions that we need to access the objects in the store. A handle of type HREPLITEM identifies each object in the store.

IReplStore::Abort

Abort the current operation.

Syntax

```
HRESULT Abort(
    UINT uFlags
);
```

Parameters

E_NOTIMPL
The requested dialog is not implemented.

R marks

This method is used to activate dialogs like options for each object type. ReplDialogs contains the list of dialogs that can be activated. Client can return E_NOTIMPL if it chooses not to implement a particular dialog. An enumerator of the HREPLITEM contained in the given folder is passed in. Client should use this enumerator to enumerate all items in the folder.

See Also

IReplStore

IReplStore::BytesToObject

Convert an array of bytes to a HREPLOBJ, which can be indeed HREPLITEM or HREPLFLD, when loading.

Syntax

HREPLOBJ BytesToObject(
 LPBYTE *lpb,*
 UINT *cb*
);

Parameters

*lpb*
Points to a buffer where the array of bytes should be store. Could be NULL.

*cb*
Size of the buffer.

Return Value

Returns the new handle.

Remarks

This method is used to convert a series of bytes into an item or folder handle.

See Also

IReplStore::ObjectToBytes

IReplStore::CompareItem

Compare the given handles using things like entry ID or file name or record number.

Syntax int CompareItem(
 HREPLITEM *hItem1,*
 HREPLITEM *hItem2*
);

Parameters

*hItem1*
Handle of first item. Server guarantees this handle is one of those returned by FindFirstItem or FindNextItem.

*hItem2*
>handle of second object. Server guarantees this handle is one of those returned by FindFrstItem or FindNextItem.

Return Value

Returns one of the following values:
>0
>>These two handles mean the same object.
>
>1
>>First object is 'bigger' than the second object.
>
>-1
>>First object is 'smaller' than the second object.

See Also

HREPLITEM, IReplStore::IsItemChanged

IReplStore::CompareStoreIDs

Compare two store ID's to see if they are equal.

Syntax

HRESULT CompareStoreIDs(
   LPBYTE *lpbID1*,
   UINT *cbID1*,
   LPBYTE *lpbID2*,
   UINT *cbID2*
);

Parameters

*lpbID1*
>points to the first store ID.

*cbID1*
>size of the first store ID.

*lpbID2*
>points to the second store ID.

*cbID2*
>size of the second store ID.

Return Value

Returns one of the following values:
>0
>>These store ID's mean the same store.
>
>1
>>First store is 'bigger' than the second store.
>
>-1
>>First store is 'smaller' than the second store.

Remarks

Replication will call this method whenever it needs to know if the current store is different than the one it last replicated with. The two store ID's passed are always generated by GetStoreInfo.

See Also

IReplStore::GetStoreInfo, STOREINFO

IReplStore::CopyObject

Copy data of a handle over to another.

Syntax

BOOL CopyObject(
   HREPLOBJ *hObjSrc*,
   HREPLOBJ *hObjDst*
);.

Parameters

*hObjSrc*
   Source handle.

*hObjDst*
   Destination handle,.

Return Value

TRUE if successful. FALSE if failed for reasons like two handles are of different types or of different sizes.

Remarks

This method is used to copy the contents of a given handle to another. Any resource allocated in the source like pointers or handles must be freed before they are overwritten, and any resource in the destination should be reset so it won't get freed after the assignment to the source. This method is always called whenever server sees an object has been modified since last replication and therefore its contents must be updated from the modified handle returned by the client via FindNextItem or FindNextItem.

See Also

IReplStore

IReplStore::FindFirstItem

Return a new handle of the first object in the given folder, if there's any.

Syntax

HRESULT FindFirstItem(
   HREPLFLD *hFolder*,
   HREPLITEM *\*phItem*,
   BOOL * *pfExist*
);.

Parameters

*hFolder*
   Handler of a folder.

*phItem*
> Output pointer. Points to a handle of item.

*pfExist*
> Output pointer, points to a boolean value that will be set to TRUE if there is an object in the folder.

Return Value

Returns one of the following values:
   E_FAIL

There are problems with the enumeration. Replication should ignore the folder.

NOERROR
       A new HREPLITEM was created for the first object in the folder and its pointer is returned.

Remarks

This function works together with FindNextItem, FindItemClose to enumerate all items in the given folder. This and FindNextItem are the only methods in IReplStore that can create HREPLITEM for the items. All HREPLITEM passed by the server are guaranteed to be originally created from these two methods. It's possible that, before FindItemClose is called, a different thread calls methods like DeleteObject that write to the store. Thus, it's important for the client to have some sort of thread synchronization between this method and the methods that writes to the store. A typical client would use critical section to make sure that, during the time between FindFirstItem and FindItemClose, no write to the store is permitted.

See Also

HREPLITEM, IReplStore::FindNextItem, IReplStore::FindItemClose

IReplStore::FindItemClose

Completes the folder enumeration.

Syntax

HRESULT FindItemClose(void);

Return Value

Returns one of the following values:
   NOERROR

Success.

Remarks

This function works together with FindFirstItem, FindNextItem to enumerate all items in the given folder. Client may do whatever it needs to complete the enumeration (free memory, delete temp. objects, etc.).

See Also

HREPLITEM, IReplStore::FindFirstItem, IReplStore::FindNextItem

IReplStore::FindNextItem

Return a new item handle of the next object in the given folder, if there's any.

Syntax

```
HRESULT FindNextItem(
    HREPLFLD hFolder,
    HREPLITEM *phItem,
    BOOL * pfExist
);
```

Parameters

*hFolder*
> Handler of a folder.

*phItem*
> Output pointer. Points to a handle of item.

*pfExist*
> Output pointer. Points to a boolean value that will be set to TRUE if there is an object in the folder.

Return Value

Returns one of the following values:
> E_FAIL
>
> There are problems with the enumeration. Replication should ignore the folder.
>
> NOERROR
> > A new HREPLITEM was created for the next object in the folder and its pointer is returned.

Remarks

This function works together with FindFirstItem, FindItemClose to enumerate all items in the given folder. This and FindFirstItem are the only methods in IReplStore that can create HREPLITEM for the objects. All HREPLITEM's passed by the server are guaranteed to be originally created from these two methods.

See Also

HREPLITEM, IReplStore::FindFirstItem, IReplStore::FindItemClose

IReplStore::FreeObject

Free the given HREPLOBJ handle.

Syntax

```
void FreeObject(
    HREPLOBJ hObject
);
```

Parameters

*hObject*
> Points to the handle of an object whose contents need to be freed.

Return Value

None.

Remarks

This method is used to free any memory pointers or delete any temp objects or anything else that might be created during the life of the handle and must be freed when the handle dies. Note that this handle could either be really a HREPLITEM or a HREPLFLD.

See Also

```
HRESULT FindN xtItem(
    HREPLFLD hFolder,
    HREPLITEM *phItem,
    BOOL * pfExist
);
```

Parameters

*hFolder*
    Handler of a folder.

*phItem*
    Output pointer. Points to a handle of item.

*pfExist*
    Output pointer. Points to a boolean value that will be set to TRUE if there is an object in the folder.

Return Value

Returns one of the following values:
    E_FAIL

There are problems with the enumeration. Replication should ignore the folder.

NOERROR
        A new HREPLITEM was created for the next object in the folder and its pointer is returned.

Remarks

This function works together with FindFirstItem, FindItemClose to enumerate all items in the given folder. This and FindFirstItem are the only methods in IReplStore that can create HREPLITEM for the objects. All HREPLITEM's passed by the server are guaranteed to be originally created from these two methods.

See Also

HREPLITEM, IReplStore::FindFirstItem, IReplStore::FindItemClose

IReplStore::FreeObject

Free the given HREPLOBJ handle.

Syntax

```
void FreeObject(
    HREPLOBJ hObject
);
```

Parameters

*hObject*
    Points to the handle of an object whose contents need to be freed.

Return Value

None.

Remarks

This method is used to free any memory pointers or delete any temp objects or anything else that might be created during the life of the handle and must be freed when the handle dies. Note that this handle could either be really a HREPLITEM or a HREPLFLD.

See Also client should modify the data indicated by this handle.

S e Also

IReplStore

IReplStore::GetObjTypeUIData

Send UI related data about an object type to the server.

Syntax

HRESULT GetObjTypeUIData(
   HREPLFLD *hFolder*,
   POBJUIDATA *pData*
);.

Parameters

*hFolder*
   Input, points to a handle of a folder that contains the items.

*pData*
   Output, points to a OBJUIDATA structure.

Return Value

Returns one of the following values:
   NOERROR

User selected OK to save the changes made.

E_OUTOFMEMORY
      Unable to load required UI resources.

See Also

IReplStore

IReplStore::GetStoreInfo

Get information about the current store instance.

Syntax

HRESULT GetStoreInfo(
   PSTOREINFO *pInfo*
);.

Parameters

*pInfo*
   pointers to the STOREINFO structure.

Return Value

Returns one of the following values:
   NOERROR

Successfully return the STOREINFO structure.

E_INVALIDARG
 The value of cbStruct is not expected.

E_POINTER
 The store is not initialized or there is a problem getting the required store ID or lpbStored is NULL.

E_OUTOFMEMORY
 The value of cbMaxStoreId is too small. Size of the ID is set in cbStoreId upon return.

Remarks

Replication will call this method with lpbStoreId set to NULL for the first time, the client should then set the cbStoreId to the size of the store id. Replication will then call this method again with an allocated buffer and the size stored in cbMaxStoreId.

See Also

STOREINFO

IReplStore::Initialize

Initialize the IReplStore client.

Syntax

HRESULT Initialize(
 IReplNotify * *pReplNotify*
);

Parameters

*pReplStatus*
 Pointer to the IReplNotify interface. Must be 0.

Return Value

Returns NOERROR for success.

See Also

IReplStore

IReplStore::IsFolderChanged

Check if any object in the given folder has been changed since the method is called last time.

Syntax

HRESULT IsFolderChanged(
 HREPLFLD *hFolder,*
 BOOL * *pfChanged*
);

Parameters

*hFolder*
 Handle to a folder.

*pfChanged*
 Points to a Boolean that will be set to TRUE if folder is changed.

Return Value

Returns one of the following values:
NOERROR

No error. *pfChanged will be set to TRUE if folder is changed or FALSE otherwise.

RERR_SHUT_DOWN
    Serious error (missing data file), client should shut down immediately.

RERR_UNLOAD
    Less serious error. Replication modules must be unloaded.

RERR_STORE_REPLACED
    The complete store (eg. user overwrite the existing Schedule+ data file) was replaced.

Remarks

If the client wants real time synchronization to be simulated (see GetStoreInfo). Replication will call this method once the timer is up to see if it needs to scan the store further to pick up any changes. This is used to reduce the number of scans replication has to make to the store, thus the efficiency can be improved. Client should simply return TRUE if it doesn't want to implement this method.

See Also

STOREINFO, IReplStore::GetStoreInfo

IReplStore::IsItemChanged

Check if the object is changed.

Syntax

BOOL IsItemChanged(
    HREPLFLD *hFolder,*
    HREPLITEM *hItem,*
    HREPLITEM *hItemComp*
);

Parameters

*hFolder*
    Handle of the folder/container that stores the object.

*hItem*
    Handle of the object.

*hItemComp*
    Handle of the object used for comparison.

Return Value

Returns one of the following values:
FALSE

No, object hasn't been changed.

TRUE
    Yes, object has changed.

Remarks

Check if the given item is changed. If hItemComp is not NULL, should check the data (time stamp, change number, etc) in hItem with hItemComp. If hItemComp is NULL, client should get the data by opening the object and compare it with the data in hItem.

See Also

HREPLITEM, IReplStore::CompareItem

IReplStore::IsItemReplicated

Check if an item should be replicated using client defined rules.

Syntax

BOOL IsItemReplicated(
   HREPLIFLD *hFolder*,
   HREPLITEM *hItem*
);.

Parameters

*hFolder*
   Handle of the folder/container that stores the object.

*hItem*
   Handle of the object, could be NULL, in which case, this function should check if the given folder should be replicated.

Return Value

Returns one of the following values:
   FALSE

No, object should not be replicated.

TRUE
      Yes, object should be replicated.

Remarks

If the client requires that some objects on the desktop PC should not be replicated, it can use this function to tell the server to ignore these objects. The client can design its own rules and store it using the handle of the folder. If all objects should be replicated, client can simply return TRUE in all calls.

See Also

IReplStore

IReplStore::IsValidObject

Check if the given handles are valid.

Syntax

HRESULT IsValidObject(
   HREPLFLD *hFolder*,
   HREPLITEM *hItem*,
   UINT *uFlags*
);.

Parameters

*hFolder*
    Handle of a folder, could be NULL.

*hItem*
    Handle of an item, could be NULL.

*uFlags*
    Reserved. Must be 0.

Return Value

Returns one of the following values:
    NOERROR

The given handles are all valid..

RERR_CORRUPT
        The data in the given handle are corrupted.

RERR_OBJECT_DELETED
        the object identified by this handle is no longer in the store.

Remarks

This method is used to check if the given handles are valid. Client should check both hFolder and hItem, if any one of them is not NULL.

See Also

IReplStore

IReplStore::ObjectToBytes

Convert the give handle (which is either HREPLFLD or HREPLITEM ); to an array of bytes when saving.

Syntax

```
UINT ObjectToBytes(
    HREPLOBJ hObject,
    LPBYTE lpb
);
```

Parameters

*hObject*
    Handle to an object.

*lpb*
    Handle to a buffer where the array of bytes should be store. Could be NULL.

Return Value

Number of bytes in the array.

Remarks

This method is used to save the data represented by a handle to disk. Server calls this method first with lpb set to NULL, client should then return the size required. Server then calls this method with a lpb points to a buffer large enough for the array.

S Also

IReplStor ::Byt sToObject

IReplStore::RemoveDuplicates

Check and remove all duplicated objects.

Syntax

HRESULT RemoveDuplicates(
   LPSTR *lpszObjType*,
   UINT *uFlags*
);.

Parameters

*lpszObjType*
   Points to the name of object type for which this operation is intended. NULL if all object types should be checked.

*uFlags*
   Reserved. Always 0.

Return Value

Returns one of the following values:
   NOERROR

Operation is completed successfully and no need to restart replication (to pick up the deletes).

RERR_RESTART
      Operation is completed successfully and replication should be restarted again (to pick up the deletes).

E_NOTIMPL
      Client does not support this operation.

Remarks

From time to time, server may see a need to ask client to scan all objects in the store to check for duplicated objects and give user a chance to remove them all. Client should return E_NOTIMPL if it chooses not to client this functionality. Otherwise, client should perform the check and remove and return NOERROR or RERR_RESTART if everything goes OK, in this case, replication will not call this method again until it sees necessary. It should return all other error codes if for some reason operation can not be performed at this time, in this case, replication will call this method again at the end of next synchronization.

See Also

IReplStore

IReplStore::ReportStatus

Server is reporting to the client about certain operations.

Syntax

HRESULT ReportStatus(
   HREPLFLD *hFolder*,
   HREPLITEM *hItem*,
   UINT *uStatus*, UINT *uParam*
);.

Parameters

*hFolder*
    Handle of the folder this status applies to. NULL if status applies to all folders.

*hItem*
    Handle of the object this status applies to. NULL if status applies to all objects.

*uStatus*
    Status code. Can be one of the following:

RSC_BEGIN_SYNC
        Synchronization is about to start.

RSC_END_SYNC
        Synchronization has ended.

RSC_BEGIN_CHECK
        Server is about to call enumeration routines FindFirstItem, FindNextItem RSC_END_CHECK
        Server has completed all enumeration calls.

RSC_DATE_CHANGED
        Use has changed the system date. This code is called on every existing item to give client a chance to reset the synchronization options that depend on date. Example, if client wants to synchronize files that are modified in the last two weeks, it may want to respond to this code to reset the enable bit for each item such that when IsItemReplicated is called later, it will re-evaluate based on the new date.

RSC_RELEASE
        Server is about to release the IReplStore object. This is called before the final IReplStore::Release call.

RSC_REMOTE_SYNC
        If uParam is TRUE, it means server is about to start remote synchronization. Client should not show any UI that requires user interaction from now on until this status code is used again with uParam equal to FALSE.

RSC_ABORT
        User has aborted the synchronization. uParam can be a combination of the following flags:

PSA_SYS_SHUTDOWN — User has shut down Windows operation system.

PSA_RESET_ABORT — Abort is completed. Client should resume normal processing.

If PSA_RESET_ABORT is not set, client should terminate whatever it is doing and return to server as soon as possible. Example: it may take a long time for the client to complete the IReplObjHandler::SetPacket routine, during this time, client may dispatch window messages. If user disconnect or cacnel synchronization during this time, server will call ReportStatus with uStatus equal to RSC_ABORT and PSA_RESET_ABORT not set in uParam. Client should respond to this call and let SetPacket to return as soon as possible. Once everything is aborted, server will call ReportStatus once again with PSA_RESET_ABORT so client can reset the abort.

*uParam*
    Additional information about the status, based on *uStatus* code.

Return Value

Returns one of the following values:
    NOERROR

No error.

E_FAIL
Depends on the status code, returning an error could mean stop the about-to-go operation.

Remarks

Client can simply return NOERROR for all cases if it is not interested.

See Also

IReplStore

IReplStore::UpdateItem

Update the object's time-stamp, change number, etc that is stored in the given handle.

Syntax void UpdateItem(
   HREPLFLD *hFolder*,
   HREPLITEM *hItemDst*,
   HREPLITEM *hItemSrc*
);

Parameters

*hFolder*
   Handle a folder that stores the item.

*hItemDst*
   Handle of the destination item.

*hItemSrc*
   Handle of the source item, could be NULL.

Return Value

None.

Remarks

Server calls this method to update the relevant information (such as time stamp or change number in the given handle. If a source handle is given, client should simply copy the information over, otherwise, client should actually open the object and get the information from the object and store it in the destination handle.

See Also

IReplStore

IReplObjHandler

An interface that implements all required functions related to the serialization/de-serialization of an object.

Methods

| IUnknown Methods | Description |
|---|---|
| IUnknown::QueryInterface | Returns pointers to supported interfaces. |
| IUnknown::AddRef | Increments reference count. |
| IUnknown::Release | Decrements reference count. |
| IReplObjHandler Methods | Description |
| IReplObjHandler::Setup | Set up the client so it's ready to serialize/de-serialize an object. |
| IReplObjHandler::Reset | Reset the client so all that are used during the serialization/de-serialization are freed. |
| IReplObjHandler::GetPacket | Client de-serializes the object and sends back a packet of data to the server. Server then sends this packet to the device or the desktop. |
| IReplObjHandler::SetPacket | A packet of data is received, client then serializes the data into an object. |

Remarks

This interface encapsulates all functions that we need to serialize or deserialize the objects. Any object can be deserialize into one or more data packets of any size (number of packets and their sizes are absolutely free for the client to decide). These packets are sent over the line to the receiver. They are received in the exact same order as they are sent and the receiver can then serialize these packets back into an object.

IReplObjHandler::DeleteObj

Inform the client that an object should be deleted.

Syntax

HRESULT DeleteObj(void);.

Return Value

Returns NOERROR for success.

Remarks

This method is called whenever replication determines that an object needs to be deleted. Note that, Setup and Reset are not called before this method. Client should delete the object specified in the given REPLSETUP structure.

See Also

IReplObjHandler

IReplObjHandler::GetPacket

A packet is needed to be sent over and it should be created by deserializing the object.

Syntax

HRESULT GetPacket(void);.

Return Value

Returns one of the following values.

NOERROR
    Successfully created one packet.

RHE_BAD_OBJECT
    Failed to create one object and if the receiver does receive some of the earlier packets, tey should be discarded.

RHW_LAST_PACKET
    A packet is successfully created, and it is the last one for the object.

Remarks

During a de-serialization of an object, server calls this method continuously until RHW_LAST_OBJECT or an error code is returned. The client is completely free to decide how many packets are to be sent over and what are the sizes of each packet. As a guideline for efficiency, a packet size is recommended to be less than 8000 bytes in size.

See Also

IReplObjHandler::SetPacket

IReplObjHandler::Reset

Inform the client that it's time to reset/clear anything used during the serialization/deserialization of an object.

Syntax

HRESULT Reset(
    BOOL *fRead*
);

Parameters

*fRead*
    TRUE if reading an object or FALSE if writing an object.

Return Value

Returns NOERROR for success.

Remarks

This method is called once per object.

See Also

IReplObjHandler::Setup, IReplObjHandler::Reset, IReplObjHandler::GotBadObject

IReplObjHandler::SetPacket

A packet is received, and it should be serialized into the object.

Syntax

HRESULT SetPacket(void);

Return Value

Returns one of the following values.

NOERROR
    The packet was successfully used to deserialize the object.

RHE_SKIP_ALL
    Failed to apply the packet toward the object and skip all remaining packet for the object.

Remarks

This method is called continuously until the last packet is received. All these packets are guaranteed to be received in the exact same number and in the exact same order as they are created by GetPacket.

See Also

IReplObjHandler::GetPacket

IReplObjHandler::Setup

Set up the client so it's ready for an object.

Syntax

HRESULT Setup(
    PREPLSETUP *pSetup*
);

Parameters

*pSetup*
    Points to REPLSETUP, which has information about the object to beserialized/deserialized.

Remarks

This method is called once per object. Needed data are stored in the passed REPLSETUP structure.

See Also

REPLSETUP

IRepINotify

Server implements this interface that can be used by client to notify the server of certain events taking place in the client store.

Methods

| IUnknown Methods | Description |
|---|---|
| IUnknown::QueryInterface | Returns pointers to supported interfaces. |
| IUnknown::AddRef | Increments reference count. |
| IUnknown::Release | Decrements reference count. |
| IRepINotify Methods | Description |
| IRepINotify::GetWindow | Get the handle of current active window to be used as parent of modal dialog or message boxes. |
| IRepINotify::OnItemCompleted | Used internally by server. Client should not call this explicitly. |
| IRepINotify::OnItemNotify | Tells server that an item has been created or deleted or modified. |
| IRepINotify::OnService | Used internally by server. Client should not call this explicitly. |
| IRepINotify::SetStatusText | Set the status text on the server. |

Remarks

This interface is implemented and exposed by the server. If the store is capable of detecting changes/deletes to the objects as they occur, client should use the interface to notify the server of these changes/deletes. This is more efficient than the usual enumerate-all-and-compare-time-stamp approach to detect changes/deletes.

IRepINotify::GetWindow

Obtain a handle to the window that must be used as a parent of any modal dialog or message box client wants to display.

Syntax

HRESULT GetWindow(
    UINT *uFlags*
);

Parameters

*uFlags*
    Reserved. Always 0.

Remarks

The flags word is reserved for future use.

See Also

IRepINotify

IRepINotify::OnItemCompleted

Used internally by server. Client should never call this explicitly.

Syntax

```
HRESULT OnObjectCompleted(
    PREPLSETUP pSetup
);
```

Parameters

*pSetup*
    Points to a REPLSETUP structure.

Remarks

This method is for use by the server; the side that implements the interface. The client should not call this method.

See Also

IReplNotify

IReplNotify::OnItemNotify

Notify the server that an object has been created or deleted or modified.

Syntax

```
HRESULT OnItemNotify(
    UINT uCode,
    LPSTR lpszProgId,
    LPSTR lpszObjType,
    HREPLITEM hItem,
    ULONG ulFlags
);
```

Parameters

*uCode*
    Code that tells what happened. Can be one of the following values:

RNC_CREATED
        Object was created.

RNC_MODIFIED
        Object was modified.

RNC_DELETED
        Object was deleted.

RNC_SHUTDOWN
        The store has been shut down. H/PC Explorer should unload the module immediately.

*lpszProgId*
    ProgId of the store.

*lpszObjType*
    Name of the object type.

*hItem*
    Handle of the concerned item.

*ulFlags*
    Miscellaneous flags.

Remarks

If the store is capable of detecting changes/deletes as they occur, client should call this method immediately after any changes/deletes are detected.

See Also

IReplNotify

IReplNotify::OnService

Used internally by server. Client should never call this explicitly.

Syntax

HRESULT OnService(
　UINT *uCode,*
　UINT *uParam*
);

Parameters

*uCode*
　Used internally.

*uParam*
　Used internally.

Remarks

This method is for use by the server; the side that implements the interface. The client should not call this method.

See Also

IReplNotify

IReplNotify::SetStatusText

Set the text to be displayed on H/PC Explorer's status control.

Syntax

HRESULT SetStatusText (
　LPSTR *lpszText*
);

Parameters

*lpszText*
　Points to a status text string.

Remarks

Status messages should be advisory only. Use modal dialogs or message boxes for information that requires user intervention.

See Also

IReplNotify.

InitObjType

To initialize data after a module is loaded, the client uses the InitObjType function with *lpszObjType* passed as a non-null pointer that points to a string. To free any allocated resources the client should use this function with *lpszObjType* is as a null pointer.

Syntax

BOOL InitObjType(
   LPWSTR *lpszObjType*
);

Parameters

*lpszObjType*
   Name of the object type to be initialized. NULL if the call means to un-initialize the data.

Return Value

Returns TRUE for success, FALSE otherwise.

Remarks

This method should be called once with *lpszObjType* not being NULL before any calls are made to the module, and once with *lpszObjType* being NULL after all calls have been made to the module.

GetObjectHandler

The GetObjectHandler function returns a pointer to the IReplObjHandler interface. This interface is used to serialize and de-serialize objects.

Syntax

**IReplObjHandler * GetObjectHandler (**
   LPWSTR *lpszObjType*
);

Parameters

*lpszObjType*
   Name of the object type.

Return Value

A pointer to the IReplObjHandler interface.

Comments

The interface is freed by using an IUnknown::Release call.

See Also

DeleteAllObjects

ObjectNotify

The server calls the ObjectNotify functionc whenever there is a change or deletion to an object in the device's object store. The function asks the client if it is interested in this change or deletion. If so, the object ID that client wants for serialization or de-serialization of the object is sent to the desktop.

Syntax

BOOL ObjectNotify(
   POBJNOTIFY *pNotify*
);

Parameters

*pNotify*
   Pointer to the OBJNOTIFY structure.

Return Value

TRUE if the change or deletion should be synchronized.

GetObjTypeInfo

Syntax

BOOL GetObjTypeInfo(
  POBJTYPEINFO *pInfo*
);

Parameters

*pInfo*
  Pointer to the OBJTYPEINFO structure.

DeleteAllObjects

The DeleteAllObjects function is used by the client to delete all objects that have been synchronized.

Syntax

```
BOOL DeleteAllObjects(
    LPWSTR lpszObjType
);
```

Parameters

*lpszObjType*
    Name of the object type.

Return Value

TRUE for success, FALSE otherwise.

See Also

GetObjectHandler

CONFINFO

The CONFINFO structure is used to retrieve information about two conflicting items. The server presents this information to the user via a dialog box so user can choose an option for resolving the conflict.

Syntax

```
typedef struct {
    UINT        cbStruct;
    HREPLFLD    hFolder;
    HREPLITEM   hLocalItem;
    HREPLITEM   hRemoteItem;
    char        szLocalName[ MAX_OBJTYPE_NAME ];
    char        szLocalDesc[ 512 ];
    char        szRemoteName[ MAX_OBJTYPE_NAME ];
    char        szRemoteDesc[ 512 ];
} CONFINFO;
```

Members

*cbStruct*
    Size of this structure

*HREPLFLD*
    Handle representing the folder where the objects are stored

*HREPLITEMSTerm1*
    Handle representing the local object

*HREPLITEM*
    Handle representing the remote object

*szLocalName*
    Name of the local object client would like to show to the user

*szLocalDesc*
    Description of the local object client would like to show to the user

*szRemoteName*
    Name of the remote object client would like to show to the user

*szRemoteDesc*
    Description of the remote object client would like to show to the user

See Also

IReplStore::GetConflictInfo

HREPLITEM

A handle on an item stored by the client.

Syntax typedef struct REPLITEM
  FAR* *HREPLITEM*;

Members

*HREPLITEM*
  A handle on an item stored by the client.

Remarks

This handle is used extensively by both the server and the client. The server has no knowledge about this handle. The server persistently loads and saves the data identified by a handle by using the IReplStore handle serialization and deserialization routines.

The data identified by the handle should meet the following requirements:

- It contains data the uniquely identifies the item, such as ENTRYID for a MAPI item, full path name for a file system item, and so forth.

- An order can be derived from the data. That is, given two handles, the client can tell if one is "larger" than the other, or if one is exactly equal to the other. This is required for efficient searching.

- The data has some sort of time stamp information such that given two handles, the client can tell if one is newer than the other. Examples are last modification time or a change number. The server uses this information to determine if an item has changed since its replicated last time.

Handles passed in by the server are always created by IReplStore::FindFirstItem or IReplStore::FindNextItem.

STOREINFO

The STOREINFO structure is used to identify an instance of the store.

Syntax

```
typedef struct {
  UINT   cbStruct;
  TCHAR  szProgId[ 256 ];
  TCHAR  szStoreDesc[ 200 ];
  UINT   uRTSOption;
  UINT   uTimerRes;
  BOOL   fSingleThreadOnly;
  UINT   cbMaxStoreId;
  UINT   cbStoreId;
  LPBYTE lpbStoreId;
} STOREINFO;
```

Members

*cbStruct*
    Size of this structure

*szProgId*
    Output, ProgID name of the store object

*szStoreDesc*
    Output, description of the store, will be displayed to the user

*uRTSOption*
    Output, specifies options for real-time synchronization. See RTSO_xxx

*uTimerRes*
    Input or Output, resolution of timer in micro-seconds. 5000 by default.

*FSingleThreadOnly*
    Output, TRUE if the client only supports single thread operation.

*CbMaxStoreId*
    Input, maximum size of the store ID that can be stored in the buffer pointed to by lpbStoreId.

*CbStoreId*
    Output, actual size of the store ID stored in buffer pointed by lpbStoreId.

*lpbStoreId*
    Output pointer to a buffer of anything that uniquely identifies the current store instance.

Remarks

Note that calls to the IReplStore interface methods can come from different threads. If the client does not support multi-threading, it must set fSingleThreadOnly to FALSE, such that the replication will serialize the calls to the methods and make them all come from the primary thread of the application. szStoreDesc can have a value such as "Schedule+ File". It is displayed to the user whenever the store ID indicates a different store, such as a different Schedule+ file, has been installed.

See Also

IReplStore::GetStoreInfo

OBJTYPEINFO

The OBJTYPEINFO structure is used to store information about a particular object type.

Syntax typedef struct {
  UINT *cbStruct*;
  WCHAR *szObjType*[ MAX_OBJTYPE_NAME ];
  UINT *uFlags*;
  WCHAR *szName*[ 80 ];
  UINT *cObjects*;
  UINT *cbAllObj*;
  FILETIME *tLastModified*;
} OBJTYPEINFO;

Members

*cbStruct*
  Input. Size of the structure in bytes.

*SzObjType*
  Input, the object type name

*uFlags*
  Input/Output.

*szName*
  Output, the name of a file system object storing all these object

*cObjects*
  Output, number of existing objects

*cbAllObj*
  Output, total number of bytes used to store existing objects

*ftLastModified*
  Output, last time any object is modified

Comments

This structure is passed to the bjTypeInfo function to ask the client about a particular object type. Client does not have to return all information requested.

OBJUIDATA

The OBJUIDTA structure is used by IRepIStore::GetObjTypeUIData to send UI related data about an object type to the Store.

Syntax

```
typedef struct {
  UINT    cbStruct;
  HICON   hIconLarge;
  HICON   hIconSmall;
  char szName[ MAX_PATH ];
  char szSyncText[ MAX_PATH ];
  char szTypeText[ 80 ];
  char szPlTypeText[ 80 ];
} OBJUIDATA;
```

Members

*cbStruct*
  The size of this structure.

*hIconLarge*
  The handle of a large icon used in the list view display of the Replication Manager

*hIconSmall*
  The handle of a small icon used in the list view display of the Replication Manager

*szName*
  Text displayed in the "Name" column of the Replication Manager

*szSyncText*
  Text displayed in the "Sync File In" column of the Replication Manager

*szTypeText*
  Text displayed in the "Type" column of the Replication Manager

*szPlTypeText*
  Plural form of text displayed in the "Type" column of the Replication Manager

See Also

IRepIStore::GetObjTypeUIData

OBJNOTIFY

The OBJNOTIFY structure is used to notify the client that an object in the Windows CE file system has changed or been deleted.

```
typedef struct {
    UINT      cbStruct;
    WCHAR     szObjType[ MAX_OBJTYPE_NAME ];
    PEGOID    oidParent;
    PEGOID    oidObject;
    UINT      uFlags;
    UINT      cOidChg;
    UINT      cOidDel;
    PEGOID    *poid;
} OBJNOTIFY;
```

Members

*cbStruct*
 Input. Size of the structure in bytes.

*SzObjType*
 Input, the object type name.

*oidParent*
 Input, the parent OID of the file system object, representing a file or a database or a database record.

*oidObject*
 Input, the OID of the file system object, representing a file or a database or a database record.

*Uflags*
 Input, Flags, see ONF_xxx.

*COidChg*
 Output, Number of oid's that's should be marked as needs to be replicated, Set to 0 if no object should be replicated because of this change.

*COidDel*
 Output, Number of oid's that's should be marked as needs to be replicated, Set to 0 if no object should be replicated because of this delete.

*poid*
 Output, Points to an array of oid's that's should be marked as needs to be replicated first cOidChg elements are for the changed objects, the last cOidDel elements are for the deleted objects Note that, memory pointed to by this pointer is owned by the client. It will not be freed by replication.

Remarks

This structure is passed to the ObjectNotify function to inform the client that an event that changes or deletes an object in the Pegasus file system has occurred. The client should return, via this structure, how many replication objects have changed or been deleted because of this change or deletion to a file system object.

See Also

ObjectNotify

CONCLUSION

The invention provides an extremely versatile way to synchronize desktop database application programs that might not have been originally designed with synchronization in mind. The invention allows for continuous synchronization of database objects, without any significant user effort, and in most cases without requiring modification of the database application programs. Rather, synchronization can be provided by implementing DLLs that execute in conjunction with the application programs. The DLL itself is not required to actually perform synchronization tasks, but rather is only required to perform specific data manipulations that are fairly straightforward in implementation.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. A method of synchronizing objects between first and second object stores, comprising:
   maintaining a reference store containing identifying data segments corresponding respectively to a plurality of objects that are to be synchronized between the first and second object stores;
   submitting a particular identifying data segment from the reference store to a first interface associated with an application program that maintains the first object store; and
   querying a second interface associated with the application program to determine whether the object corresponding to said particular identifying data segment has been changed in the first object store.

2. One or more computer-readable media comprising computer executable instructions for performing the method recited in claim 1.

3. A method as recited in claim 1, further comprising updating the second object store with the changed object from the first object store if the object has been changed in the first object store.

4. A method as recited in claim 1, further comprising:
   determining whether the object corresponding to said particular identifying data segment has been changed in the second object store; and
   updating the first object store with the changed object from the second object store if the object has been changed in the second object store.

5. A method as recited in claim 1, further comprising receiving the identifying data segments from one or more interfaces associated with the application program, wherein each identifying data segment contains an object identifier for a corresponding object in the first object store.

6. A method as recited in claim 1, further comprising receiving the identifying data segments from one or more interfaces associated with the application program, wherein some of the identifying data segments contain data representing properties that are supported by the second object store but that are not supported by the first object store.

7. A method of synchronizing objects between first and second object stores, comprising:
   maintaining a reference store containing identifying data segments corresponding respectively to a plurality of objects that have previously been synchronized between the first and second object stores;
   submitting a particular identifying data segment from the reference store to a first interface method associated with an application program that maintains the first object store;
   in response to submitting said particular identifying data segment from the reference store, receiving a handle that corresponds to said particular identifying data segment; and
   querying a second interface associated with the application program with the received handle to determine if the object corresponding to said particular identifying data segment has been changed in the first object store since the last synchronization.

8. One or more computer-readable media comprising computer executable instructions for performing the method recited in claim 7.

9. A method as recited in claim 7, further comprising if the object has been changed in the first object store, updating the second object store with the changed object from the first object store.

10. A method as recited in claim 7, further comprising:
    maintaining a mapping between identifying data segments and object identifiers that are used in the second store to identify objects; and
    submitting the object identifier that is mapped to the particular identifying data segment to a program that maintains the second object store to determine whether the object corresponding to said particular identifying data segment has been changed in the second object store.

11. A method as recited in claim 7, further comprising:
    maintaining a mapping between identifying data segments and object identifiers that are used in the second store to identify objects;
    submitting the object identifier that is mapped to the particular identifying data segment to a program that maintains the second object store to determine whether the object corresponding to said particular identifying data segment has been changed in the second object store; and
    if the object has been changed in the second object store, updating the first object store with the changed object from the second object store.

12. A method as recited in claim 7, further comprising receiving the identifying data segments from one or more interfaces associated with the application program, wherein each identifying data segment contains an object identifier for a corresponding object in the object store.

13. A method as recited in claim 7, further comprising receiving the identifying data segments from one or more interfaces associated with the application program, wherein some of the identifying data segments contain data representing properties that are supported by the second object store but that are not supported by the first object store.

14. One or more computer-readable media comprising computer executable instructions that, when executed, direct a computing system to synchronize objects between first and second object stores, the instructions comprising:
    maintaining a reference store containing identifying data segments corresponding respectively to a first group of objects;
    submitting the identifying data segments to a first interface associated with an application program that maintains the first object store, wherein the first object store includes a second group of objects that potentially includes at least some of the first group of objects;

in response to submitting said identifying data segments, receiving a first list of handles, said handles corresponding respectively to the objects of the first group;

querying a second interface associated with the application program for a second list of handles, said handles corresponding respectively to the objects of the second group;

matching any handles of the first and second lists that correspond to the same object; and querying a third interface associated with the application program with matching handles from the first and second lists to determine if the object to which they correspond has been changed in the first object store.

15. One or more computer-readable media as recited in claim 14, wherein said matching comprises querying a fourth interface associated with the application program to determine whether handles of the first and second lists correspond to the same object.

16. One or more computer-readable media as recited in claim 14, further comprising computer executable instructions that, when executed, perform concluding that a particular object has been deleted from the first object store if the handle from the first list corresponding to said particular object does not have a matching handle from the second list.

17. One or more computer-readable media as recited in claim 14, further comprising computer executable instructions that, when executed, perform concluding that a particular object has been added to the first object store if the handle from the second list corresponding said particular object does not have a matching handle from the first list.

18. One or more computer-readable media as recited in claim 14, further comprising computer executable instructions that, when executed, perform updating the second object store with any objects that have been changed in the first object store.

19. One or more computer-readable media as recited in claim 14, further comprising computer executable instructions that, when executed, perform:

receiving a modified form of a particular object from the second object store;

identifying which handle from the second list corresponds to said particular object;

providing the identified handle and the modified form of said particular object to a fourth interface associated with the application program; and instructing the application program to replace the object corresponding to the identified handle with the modified form of the object.

20. One or more computer-readable media as recited in claim 14, further comprising computer executable instructions that, when executed, perform:

maintaining a mapping between handles and object identifiers that are used in the second store to identify objects;

receiving a modified form of a particular object from the second object store;

receiving an object identifier corresponding to said particular object;

referencing the mapping with the object identifier to identify which handle corresponds to said particular object;

providing the identified handle and the modified form of said particular object to a fourth interface associated with the application program; and instructing the application program to replace the object corresponding to the identified handle with the modified form of the object.

21. One or more computer-readable media as recited in claim 14, further comprising computer executable instructions that, when executed, perform:

receiving a modified form of a particular object from the second object store;

identifying which handle from the second list corresponds to said particular object;

providing the identified handle and the modified form of said particular object to a fourth interface associated with the application program;

instructing the application program to replace the object corresponding to the identified handle with the modified form of the particular object;

requesting new identifying data from a fifth interface associated with the application program for the object corresponding to the identified handle; and updating the reference store with the new identifying data.

22. One or more computer-readable media as recited in claim 14, further comprising computer executable instructions that, when executed, perform:

requesting new identifying data for a particular object from a fourth interface associated with the application program if the particular object has been changed in the first object store; and updating the reference store with the new identifying data for said particular object.

23. One or more computer-readable media as recited in claim 14, further comprising computer executable instructions that, when executed, perform maintaining a mapping between handles and object identifiers that are used in the second store to identify objects.

24. One or more computer-readable media as recited in claim 14, further comprising computer executable instructions that, when executed, perform:

maintaining a mapping between handles and object identifiers that are used in the second store to identify objects; and maintaining a mapping between the identifying data segments and the object identifiers.

25. One or more computer-readable media as recited in claim 14, further comprising computer executable instructions that, when executed when a particular object has been changed in the first object store, perform:

receiving a modified form of the particular object from the second object store;

identifying which handle from the second list corresponds to said particular object;

providing the identified handle and the modified form of said particular object to a fourth interface associated with the application program;

querying a fifth interface associated with the application program for conflict resolution text; and prompting a user using the conflict resolution text.

26. A set of application program interfaces embodied on a computer-readable medium for execution on a computer in conjunction with an application program that maintains an object store, comprising:

a first interface that receives an identifying data segment and that returns a handle corresponding to the identifying data segment;

a second interface that enumerates a list of handles corresponding respectively to objects in the object store and to identifying data segments from the respective objects; and a third interface that receives two handles and in response compares the identifying data segments corresponding to the handles and returns an indication of whether the handles represent an unchanged object.

27. A set of application program interfaces as recited in claim 26, further comprising a fourth interface that receives two handles and that returns an indication of whether the two handles correspond to the same object.

28. A set of application program interfaces as recited in claim 26, further comprising:
a fourth interface that receives an object having individual properties and that stores at least some of the individual properties in the object store; and
a fifth interface that returns data representing properties of the object that are not supported by the object store.

29. A set of application program interfaces as recited in claim 26, further comprising:
a fourth interface that receives two handles and that returns an indication of whether the two handles correspond to the same object;
a fifth interface that receives an object having individual properties and that stores at least some of the individual properties in the object store; and
a sixth interface that returns data representing properties of the object that are not supported by the object store.

30. A method for synchronizing objects between first and second object stores, wherein the second object store has objects that include properties not supported by the first object store, comprising:
sending an object from the second object store to an interface associated with an application program that maintains the first object store;
storing at least some individual properties of the object in the first object store;
returning data representing unsupported individual properties without storing them in the first object store; and
storing the returned data in a reference store that is not implemented by the application program.

31. A method as recited in claim 30, further comprising returning the object, including the unsupported individual properties, to the second object store.

32. A method as recited in claim 30, further comprising:
sending the returned data from the reference store to an interface associated with the application program; and
returning the object, including the unsupported individual properties, to the second object store.

33. A system for synchronizing objects between first and second object stores, wherein the second object store has objects that include properties not supported by the first object store, comprising:
a primary computer;
an application program that executes on the primary computer to maintain the first object store;
a synchronization manager that executes on the primary computer;
the synchronization manager being configured to send an object from the second store to an interface associated with the application program;
the application program and its interfaces being configured to store at least some individual properties of the object in the first object store and to return data representing unsupported individual properties to the synchronization manager without storing them in the first object store; and
the synchronization manager being further configured to store the returned data in a reference store.

34. A system as recited in claim 33, wherein:
the synchronization manager is further configured to request the object from an interface associated with the application program;
wherein the application program and its interfaces receive the data representing the unsupported properties from the synchronization manager and return the object to the synchronization manager; and
wherein the synchronization manager sends the object to the second object store.

35. A system as recited in claim 33, further comprising a portable information device that maintains the second object store.

* * * * *